US007992157B2

(12) United States Patent
Yoguchi

(10) Patent No.: US 7,992,157 B2
(45) Date of Patent: Aug. 2, 2011

(54) DISK TRANSPORTATION MECHANISM AND A DISK APPARATUS COMPRISING THE SAME

(75) Inventor: Aki Yoguchi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 505 days.

(21) Appl. No.: 12/203,608

(22) Filed: Sep. 3, 2008

(65) Prior Publication Data

US 2009/0070793 A1    Mar. 12, 2009

(30) Foreign Application Priority Data

Sep. 6, 2007   (JP) .................................. 2007-231667

(51) Int. Cl.
*G11B 17/04* (2006.01)
(52) U.S. Cl. ........................................ 720/623; 720/704
(58) Field of Classification Search .......... 720/619–623, 720/703, 704
See application file for complete search history.

(56) References Cited

U.S. PATENT DOCUMENTS

| | | | | | |
|---|---|---|---|---|---|
| 4,674,079 | A | * | 6/1987 | Agostini ........................ | 720/623 |
| 5,195,077 | A | * | 3/1993 | Ishikawa et al. .............. | 720/623 |
| 5,204,849 | A | * | 4/1993 | Yamada et al. ................ | 720/623 |
| 5,255,255 | A | * | 10/1993 | Kaneda et al. ................ | 720/621 |
| 5,416,763 | A | * | 5/1995 | Ohsaki ........................... | 720/623 |
| 6,137,761 | A | * | 10/2000 | Oh et al. ........................ | 720/620 |
| 6,167,015 | A | * | 12/2000 | Jeong ............................ | 720/623 |
| 6,463,025 | B1 | * | 10/2002 | Scholz .......................... | 720/622 |
| 6,826,766 | B2 | * | 11/2004 | Tuchiya ........................ | 720/620 |
| 7,140,030 | B2 | * | 11/2006 | Togawa ......................... | 720/623 |
| 7,162,725 | B2 | | 1/2007 | Shitamichi et al. | |
| 7,356,825 | B2 | * | 4/2008 | Makisaka et al. ............. | 720/626 |
| 2003/0165104 | A1 | | 9/2003 | Shimozaki | |
| 2005/0060727 | A1 | * | 3/2005 | Hirano et al. ................. | 720/622 |
| 2006/0037034 | A1 | * | 2/2006 | Lee ................................ | 720/623 |
| 2006/0117331 | A1 | | 6/2006 | Joo et al. | |
| 2007/0174857 | A1 | * | 7/2007 | Lee ................................ | 720/624 |
| 2007/0250843 | A1 | * | 10/2007 | Fujisawa et al. .............. | 720/623 |
| 2007/0271574 | A1 | * | 11/2007 | Yoguchi et al. ............... | 720/623 |
| 2009/0070793 | A1 | * | 3/2009 | Yoguchi ........................ | 720/600 |

FOREIGN PATENT DOCUMENTS

| | | |
|---|---|---|
| JP | 2003-257107 A | 9/2003 |
| JP | 2005251362 A | 9/2005 |
| JP | 2006-155853 A | 6/2006 |
| JP | 2006-302476 A | 11/2006 |

OTHER PUBLICATIONS

Office Action for corresponding JP application 2007-231667 dated Jun. 30, 2009.

* cited by examiner

*Primary Examiner* — Brian Miller
(74) *Attorney, Agent, or Firm* — Matthew B. Dernier, Esq.; Gibson & Dernier LLP

(57) ABSTRACT

A disk transport apparatus is disclosed which can transport a disk appropriately. First and second arms are mounted for pivotal motion in first and second directions in which they are spaced from each other around second ends thereof to transport the disk. A link pivots the first or second arm in response to pivotal motion of the second or first arm. The first arm and the link have teeth and meshing portions which mesh with each other. The first arm has a blocking portion which blocks, when the second arm is pivoted in the second direction with the disk contacting only with the second arm, meshing engagement between the meshing portions to block pivotal motion of the arms in the first and second directions.

13 Claims, 25 Drawing Sheets

DISK TRANSPORTATION MECHANISM AND A DISK APPARATUS COMPRISING THE SAME

BACKGROUND OF THE INVENTION

This invention relates to a disk transport apparatus for transporting a disk as a recording medium and a disk apparatus which includes a disk transport apparatus of the type mentioned.

Disk apparatus are known in the past which read out information recorded on a disk such as a CD (Compact Disc), a DVD (Digital Versatile Disc) or a BD (Blu-ray disk: registered trademark) and record information on the disk. Such known disk apparatus of the past include a tray type disk apparatus and a slot type disk apparatus which use different transport mechanisms for transporting a disk into the disk apparatus.

One of such known tray type disk apparatus of the past includes a tray for receiving a disk placed thereon and transports the tray to the outside and the inside of a housing of the disk apparatus to transport a disk to the outside and the inside of the housing.

Another one of the tray type disk apparatus of the past includes an arm for transporting a disk inserted in an opening for disk accommodation. A tray type disk apparatus of the type just described is disclosed, for example, in Japanese Patent Laid-Open No. 2005-251362 (hereinafter referred to as Patent Document 1).

In the disk apparatus disclosed in Patent Document 1, two sliders are provided in the proximity of the opening for disk accommodation for sliding movement in a disk insertion direction into the opening and also in a perpendicular direction to the insertion direction. An arm is provided for pivotal motion on each of the two sliders and has two rotatable rollers provided at the opposite ends thereof. The arms are provided in an inclined relationship to the disk insertion direction for pivotal motion toward and away from each other around the axes of those rollers which are provided adjacent the opening.

If a disk is inserted into the opening of the disk apparatus, then an end edge of the disk is contacted with the rollers of the arms on the opening side to slidably move the sliders in directions in which they are spaced away from each other in accordance with the diametrical dimension of the disk. Then, the arms provided on the sliders are pivoted away from each other while the disk is moved in. In this state, the sliders slidably move in the disk insertion direction to accommodate the disk into the inside of the apparatus.

On the other hand, when the disk is to be carried out, the rollers, arms and sliders operate reversely to those upon carrying in of the disk to push out the disk from the opening.

However, in the disk apparatus disclosed in Patent Document 1, if a second disk of a comparatively small diametrical dimension such as, for example, a disk having a diameter of 8 cm is inserted to a position displaced to an end portion of the opening for disk accommodation, occasionally the disk is not transported appropriately.

For example, if a second disk is inserted to a position displaced to an end portion of the opening for disk accommodation which is formed in accordance with a first disk having a comparatively great diametrical dimension such as a disk having a diameter of 12 cm, then the second disk is sometimes inserted into the inside of the apparatus in a state wherein it is gripped by one of the rollers. In such an instance, the disk cannot be placed at an appropriate position in the housing such as a position corresponding to a turntable for rotating the disk.

SUMMARY OF THE INVENTION

Therefore, it is desirable to provide a disk transport apparatus and a disk apparatus which can transport a disk appropriately.

According to an embodiment of the present invention, there is provided a disk transport apparatus for transporting a disk, including first and second arms disposed such that first end portions thereof are positioned closely to each other while second end portions thereof are spaced away from each other and mounted for pivotal motion in a first direction and a second direction in which the first and second arms are spaced away from each other around the second end portions thereof to transport the disk, and a link for pivoting one of the first and second arms in response to pivotal motion of the other one of the first and second arms, the first arm and the link having a plurality of teeth and an arm side meshing portion and a link side meshing portion, respectively, which mesh with each other, the first arm having a pivotal motion blocking portion which blocks, when the second arm is pivoted in the second direction in a state wherein the disk contacts only with the second arm, meshing engagement between the arm side meshing portion and the link side meshing portion to block the pivotal motion of the first and second arms in the first and second directions, respectively.

With the disk transport apparatus, only when the disk is brought into contact with both of the first and second arms, pivotal motion of the first and second arms in the first and second directions when the disk is transported is permitted. Thus, the disk can be transported in an appropriate direction to an appropriate position in a state wherein the center of the disk is centered on a straight light which passes a middle point between the first and second arms.

Accordingly, the first and second disks having different diametrical dimensions can individually be carried in appropriately.

DETAILED DESCRIPTION OF THE PREFERRED EMBODIMENTS

1. First Embodiment

In the following, a first preferred embodiment of the present invention is described with reference to the accompanying drawings.

[General Configuration of the Disk Apparatus 1]

Figure 1:
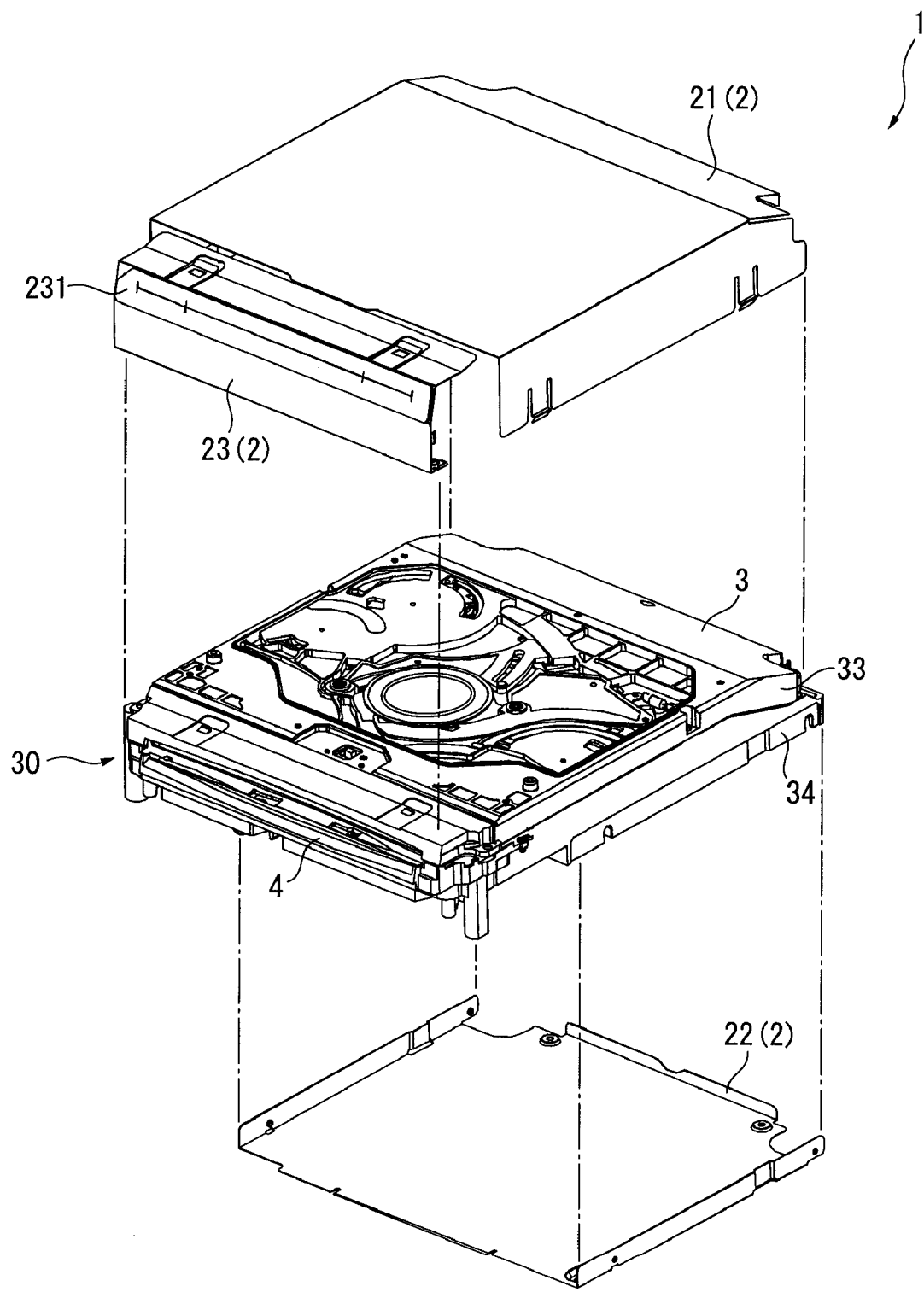
FIG. 1 is an exploded perspective view showing a disk apparatus to which an embodiment of the present invention is applied.

FIG. 1 shows a disk apparatus 1 to which the present invention is applied.

Referring to FIG. 1, the disk apparatus 1 is formed as a slot-in type disk apparatus which accommodates a disk as a recording medium such as a CD, a DVD or a BD and performs reading of information recorded on the disk or recording of information on the disk. The disk apparatus 1 is configured such that it can accommodate, as a disk D, a first disk D1 and a second disk D2 having a smaller diametrical dimension than the first disk D1 and execute reading and recording of information from and on the first disk D1 or the second disk D2. The first disk D1 may of a type which has a diameter of 12 cm while the second disk D2 may be of another type which has another diameter of 8 cm.

As seen in FIG. 1, the disk apparatus 1 includes an apparatus body 3 for accommodating a disk D, and a cover member 2 made of a metal material for covering the apparatus body 3.

The cover member 2 includes a top cover 21, a bottom cover 22 and a front cover 23 which cover an upper face portion, a bottom face portion and a front face portion of the apparatus body 3, respectively. Consequently, almost all area of the apparatus body 3 is covered with the cover member 2.

Though not particularly shown, the front cover 23 has an opening formed at a position thereof corresponding to and having a substantially same size as that of an opening 30 for disk accommodation which is defined by a recessed portion 331 of an upper unit 33 and a recessed portion 91 of a bracket 9 hereinafter described. The front cover 23 further has a cloth curtain 231 attached to a position thereof corresponding to the opening and having a slit through which the disk D is inserted and removed. The cloth curtain 231 can be formed, for example, from felt.

[Configuration of the Apparatus Body 3]

Figure 2:
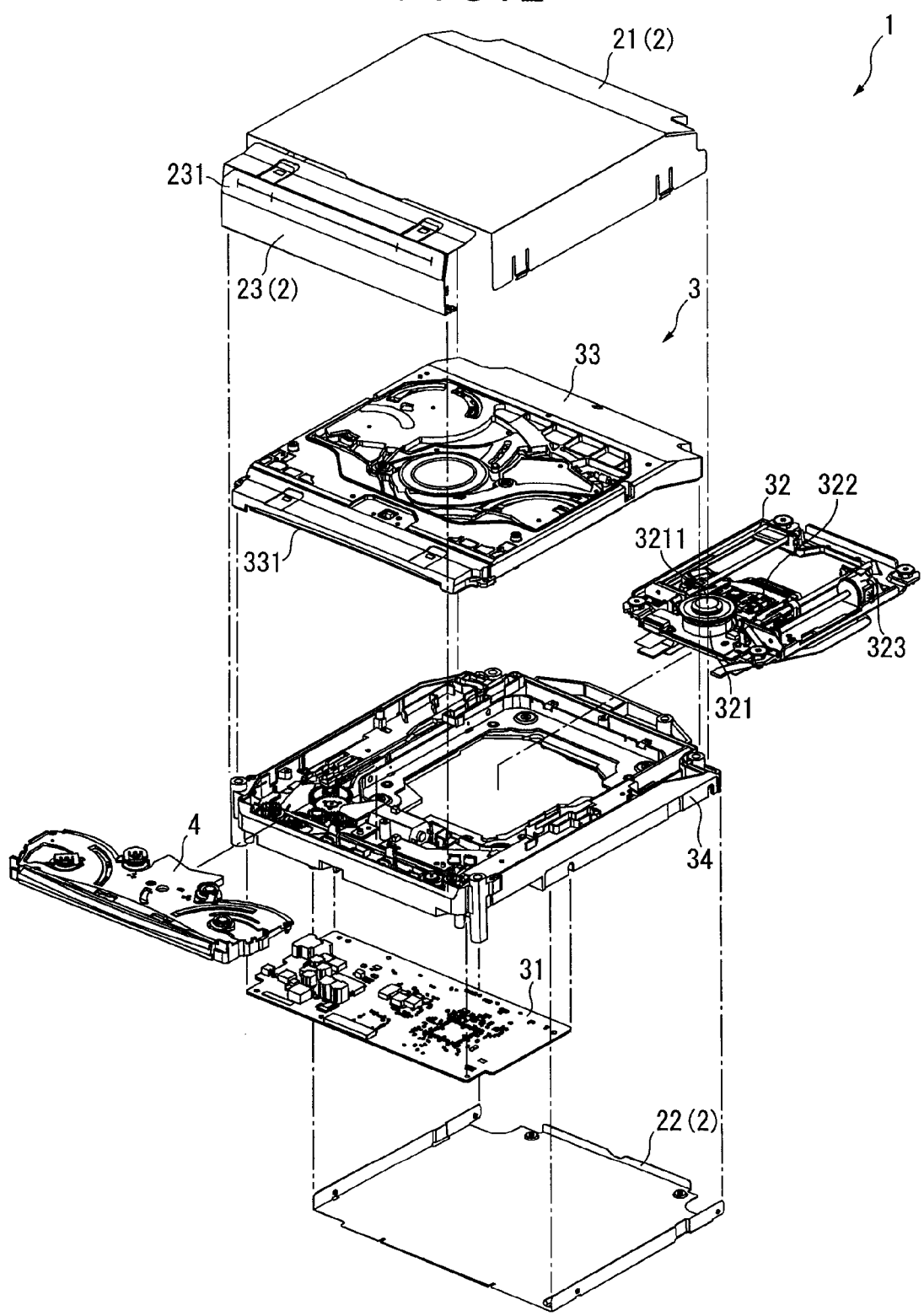
FIG. 2 is an exploded perspective view showing an apparatus body of the disk apparatus of FIG. 1.

FIG. 2 shows the apparatus body 3.

If the disk D is inserted into the opening 30 for disk accommodation, then the apparatus body 3 carries and accommodates the disk D into the inside thereof and performs reading of information recorded on the disk D and recording of information on the disk D. Further, it an eject switch not shown is inputted by a user, then the apparatus body 3 carries out the disk D accommodated therein to the outside through the opening 30. The apparatus body 3 includes a control unit 31, an optical unit 32, an upper unit 33, a lower unit 34 and a transport unit 4.

[Configuration of the Control Unit 31]

The control unit 31 is formed as a circuit board for controlling driving of the apparatus body 3. The control unit 31 drives a motor 344 provided on the lower unit 34 to carry the disk D into the inside of the apparatus body 3 by the transport unit 4 when a switch (not shown) for detection of disk insertion provided on a control board 345 of the lower unit 34 hereinafter described is inputted by a front arm 6 of the transport unit 4. On the other hand, if the eject switch mentioned hereinabove is inputted, then the control unit 31 controls the motor 344 to rotate reversely so that the disk D is carried out to the outside of the apparatus body 3 by the transport unit 4.

Further, the control unit 31 controls the optical unit 32 to execute reading of information from the disk D accommodated in the apparatus body 3 and recording of information on the disk D.

[Configuration of the Optical Unit 32]

The optical unit 32 is attached to a holder 342 disposed substantially at the center of a base frame 341 of the lower unit 34 hereinafter described and chucks the disk D when the holder 342 moves upwardly in response to carrying in of the disk D. Then, the optical unit 32 irradiates a laser beam upon the disk D to carry out reading and recording of information.

The optical unit 32 includes a motor 321 having a turntable 3211 for chucking the disk D to rotate the disk D, a pickup 322, a motor 323 for moving the pickup 322 in a direction along a diametrical dimension of the disk D, and a control board 44. Driving of the motors 321 and 323 and the pickup 322 is controlled by the control unit 31.

[Configuration of the Upper Unit 33]

The upper unit 33 is attached to the base frame 341 which composes the lower unit 34 hereinafter described and is a box-shaped member of a substantially rectangular shape as viewed in plan which forms an upper portion of the apparatus body 3 in an appearance together with the lower unit 34. In other words, the upper unit 33 and the lower unit 34 correspond to a housing.

Though not particularly shown, the upper unit 33 includes various arms which adjust, upon carrying in of the disk D, the disk D carried in by the transport unit 4 to the position of the turntable 3211 described hereinabove and feed out, upon carrying out of the disk D, the disk D chucked by the turntable 3211 to the transport unit 4.

Further, the upper unit 33 has a recessed portion 331 formed at the center of a face which interconnects the opposite end portions in the longitudinal direction. The recessed portion 331 cooperates with the recessed portion 91 formed in the bracket 9 (refer to FIG. 4) of the transport unit 4 hereinafter described to define the opening 30 for disk accommodation.

[Configuration of the Lower Unit 34]

Figure 3:
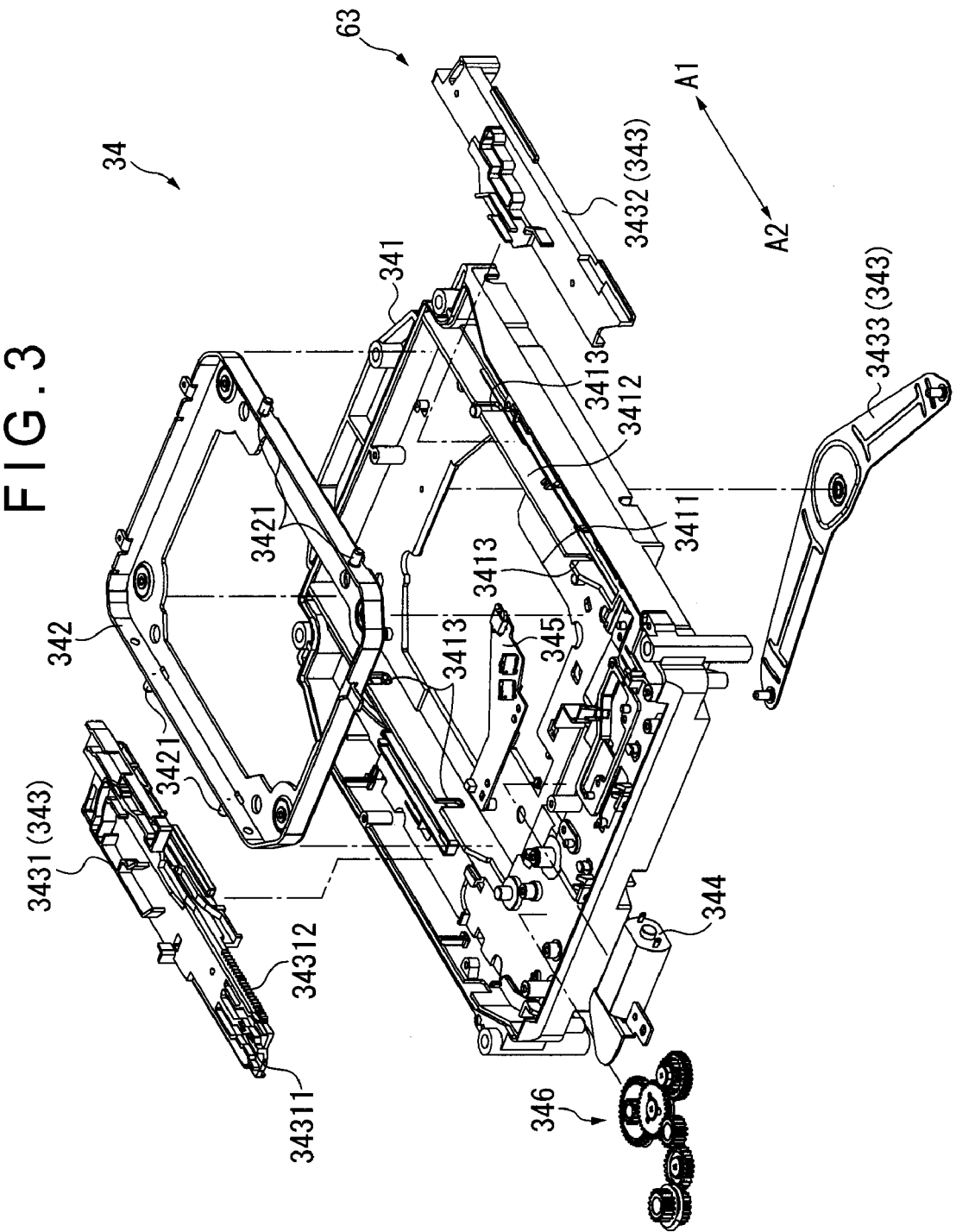
FIG. 3 is an exploded perspective view showing a lower unit of the apparatus body of FIG. 2.

FIG. 3 shows the lower unit 34.

As described above, the lower unit 34 forms a lower portion of the appearance of the apparatus body 3 and has the control unit 31, optical unit 32, upper unit 33 and transport unit 4 attached thereto.

As seen in FIG. 3, the lower unit 34 includes a holder 342, a lifting mechanism 343, a motor 344, a control board 345 and a transmission mechanism 346 as well as a base frame 341 on which the components mentioned are placed.

The base frame 341 is a box-shaped housing having a generally substantially parallelepiped shape, and has a substantially rectangular opening 3411 formed at the center thereof and an upright portion 3412. The upright portion 3412 stands uprightly from the bottom face of the base frame 341 and surrounds the opening 3411. The holder 342 on which the optical unit 32 described hereinabove is placed is disposed on the inner side of the upright portion 3412. The upright portion 3412 blocks sliding movement of the holder 342 along the bottom face of the base frame 341.

Projections 3421 are formed on the holder 342 and fitted in grooves 3413 formed in the upright portion 3412. The projections 3421 are held in engagement with two slide cams 3431 and 3432 which form the lifting mechanism 343.

The lifting mechanism 343 includes two slide cams 3431 and 3432 disposed in such a manner as to sandwich the holder 342 along the longitudinal direction of the base frame 341, and a link arm 3433 connected to the slide cams 3431 and 3432 and mounted for pivotal motion around a portion thereof at which it is attached to the base frame 341. The slide cams 3431 and 3432 are slidably moved in the opposite directions by the link arm 3433.

The slide cam 3431 has formed thereon a plurality of grooves 34311 for engaging with the front arm 5 which composes the transport unit 4 hereinafter described to lock the front arm 5, and a rack portion 34312 for meshing with a gear wheel of the transmission mechanism 346.

If the disk D is carried into the apparatus body 3 by the transport unit 4 hereinafter described, then the slide cam 3431 slidably moves in the opposite direction, that is, in the direction indicated by an arrow mark A2, to the carrying-in direction of the disk D, that is, the direction indicated by an arrow mark A1, by an arm (not shown) provided on the upper unit 33. Thereupon, the slide cam 3432 is slidably moved in the carrying-in direction of the disk D, that is, in the direction indicated by the arrow mark A1, by the link arm 3433 which is pivoted by the sliding movement of the slide cam 3431. In response to the sliding movement of the slide cams 3431 and 3432, the holder 342 whose sliding movement is blocked by the upright portion 3412 described hereinabove moves upwardly. When the holder 342 moves upwardly, the turntable 3211 of the optical unit 32 is brought into contact with the disk D to allow chucking of the disk D.

On the other hand, when the disk D is to be carried out to the outside of the apparatus body 3, the slide cam 3431 is slidably moved in the opposite direction to the carrying-out direction of the disk D, that is, in the direction indicated by the arrow mark A2, by the transmission mechanism 346 conversely to that upon carrying-in. Thereupon, the slide cam 3432 is slidably moved in the carrying-out direction, that is, in the direction indicated by the arrow mark A2, by the link arm 3433. Consequently, the holder 342 moves down. When the holder 342 moves down, the chucking between the turntable 3211 and the disk 4 is canceled.

The motor 344 is attached to the base frame 341 and supplies driving power to the transmission mechanism 346.

The control board 345 is a circuit board for controlling driving of the motor 344. Though not particularly shown, a plurality of push-type switches are provided on the control board 345 and include a switch for detection of insertion of a disk which is inputted and placed into an on state when the disk D is inserted into the opening 30, a switch which is inputted and placed into an on state in response to pivotal motion of the front arm 6 of the transport unit 4 hereinafter described, and a switch which is inputted and placed into an on state in response to sliding movement of the slide cam 3432 in the direction indicated by the arrow mark A2. In response to changeover of the switches between on and off states, insertion of the disk D into the opening 30, the amount of pivotal motion of the front arm 6 and completion of carrying in of the disk D are detected, respectively. The control board 345 controls driving of the motor 344 in response to the detection states.

The transmission mechanism 346 includes a plurality of gear wheels and transmits rotational force of the motor 344 to the slide cam 3431 described hereinabove and the transport unit 4 hereinafter described.

[Configuration of the Transport Unit 4]

Figure 4:
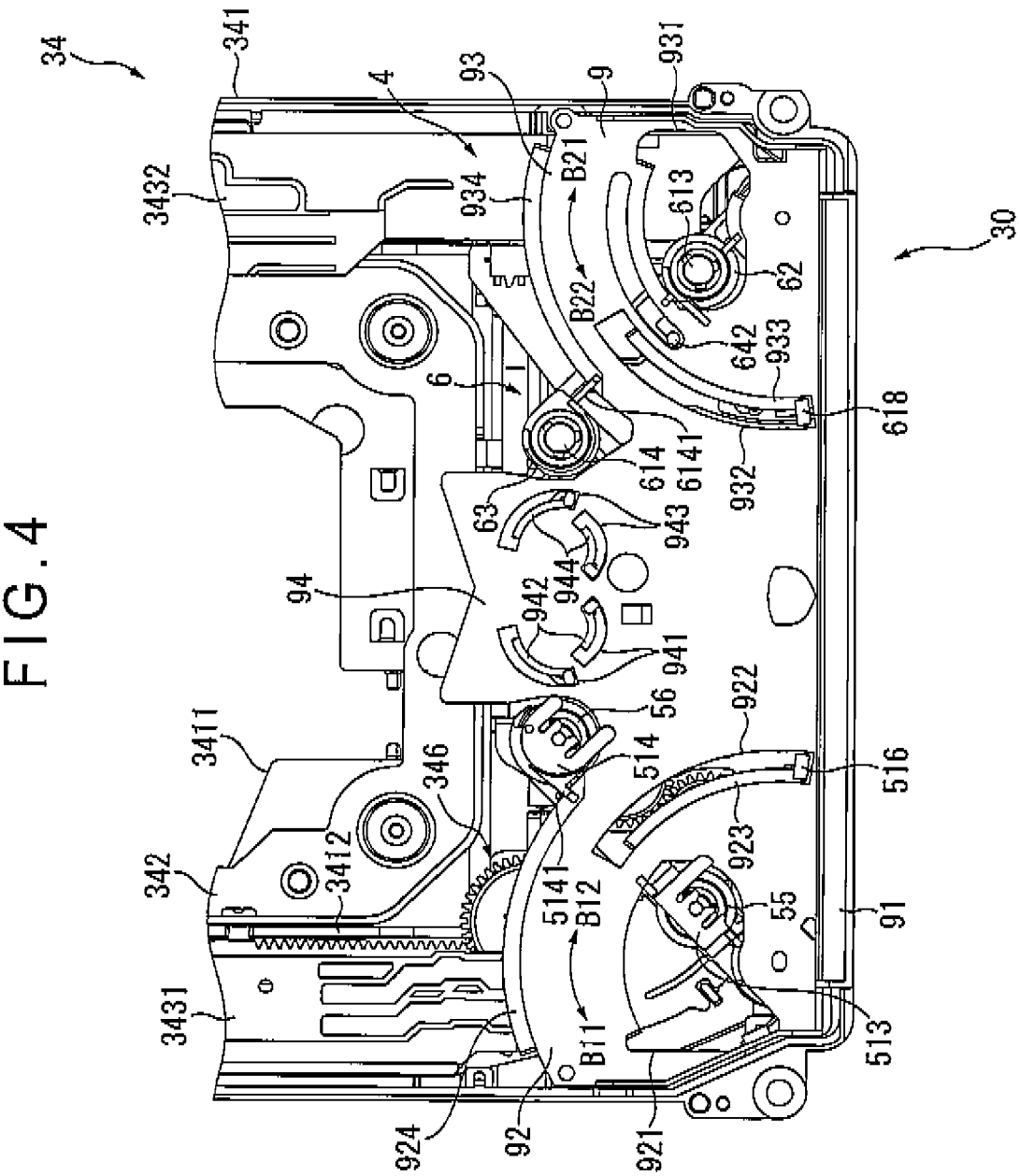
FIGS. 4 and 5 are plan views showing a transport unit of the apparatus body of FIG. 2.

FIG. 4 shows the transport unit 4 mounted on the base frame 341.

Referring to FIG. 4, the transport unit 4 corresponds to a disk transport apparatus, and carries the disk D inserted in the opening 30 into the apparatus body 3 and carries out the disk D accommodated in the apparatus body 3 to the outside of the opening 30. The transport unit 4 includes a pair of front arms 5 and 6, and a pair of link gears 7 and 8 which are held in meshing engagement with the front arms 5 and 6, respectively, and correspond to a link. The transport unit 4 further includes two torsion springs TSL and TSR serving as biasing means for biasing the front arms 5 and 6 toward the opening 30, respectively, and a bracket 9 to which the components mentioned of the transport unit 4 are attached.

[Configuration of the Bracket 9]

The bracket 9 is disposed on one end portion side of the base frame 341 in the longitudinal direction and on the side on which the transmission mechanism 346 is provided as seen in FIG. 4. In other words, the bracket 9 is attached to the side of the base frame 341 on which the opening 30 is defined by the base frame 341.

The bracket 9 is a member in the form of a flat plate made of a synthetic resin material and is formed substantially symmetrically with respect substantially to the center thereof in the longitudinal direction. The recessed portion 331 is formed on one end side of the bracket 9, and the recessed portion 331 of the bracket 9 and the recessed portion 331 of the front arm 5 cooperate with each other to form the opening 30.

Further, an arm attaching portion 92 to which the front arm 5 is attached is formed on one end portion side of the bracket 9 in the longitudinal direction. Meanwhile, an arm attaching portion 93 to which the front arm 6 is attached is formed on the other end portion side of the bracket 9 in the longitudinal direction. Further, a link attaching portion 94 to which the link gears 7 and 8 are attached is formed on the bracket 9 in such a manner as to be sandwiched by the arm attaching portions 92 and 93.

Though not particularly shown, a pair of substantially arcuate support portions are formed at positions displaced to the recessed portion 91 in the proximity of the opposite ends of the bracket 9 in the longitudinal direction on the lower face side of the bracket 9 corresponding to the arm attaching portions 92 and 93, that is, the side which opposes to the base frame 341. The support portions are inserted in openings 511 and 7211 of a circular shape as viewed in plan formed in the front arms 5 and 6 such that the front arms 5 and 6 are supported for pivotal motion individually by the support portions, respectively.

Further, openings 921 and 931 are formed in the arm attaching portions 92 and 93 in the proximity of the opposite ends in longitudinal direction, and first roller support portions 513 and 613 of the front arms 5 and 6 are fitted in the openings 921 and 931, respectively. Furthermore, in order to guide the front arms 5 and 6 for pivotal motion and prevent coming off of the front arms 5 and 6, arcuate guide holes 922 and 932 and offset portions 923, 933 and 924, 934 centered at the center of the support portions described hereinabove are formed on the arm attaching portions 92 and 93, respectively.

Further, a substantially arcuate hole portion 935 centered at the support portion described hereinabove is formed on the inner side of the guide hole 932 on the outer side of the opening 931 on the arm attaching portion 93. A contacting pin 642 of the detection lever 64 for disk detection provided on the front arm 6 is exposed to the upper face side of the bracket 9 through the hole portion 935.

Two other support portions of a substantially cylindrical shape are formed at positions substantially at the center in the longitudinal direction on the lower face side of the bracket 9 corresponding to the link attaching portion 94 but displaced to an end portion of the lower face on the opposite side to the recessed portion 91. The support portions are fitted in openings 71 and 81 of a substantially circular shape as viewed in plan formed in the link gears 7 and 8 such that the link gears 7 and 8 are supported for rotation by the support portions, respectively.

Further two guide holes 941 and 943 having offset portions 942 and 944, respectively, are formed around the support portions. Hooked portions 72 and 82 of the link gears 7 and 8 contact with an upper face of the offset portions 942 and 944 to prevent the link gears 7 and 8 from coming off from the bracket 9.

[Configuration of the Front Arms 5 and 6]

Figure 5:
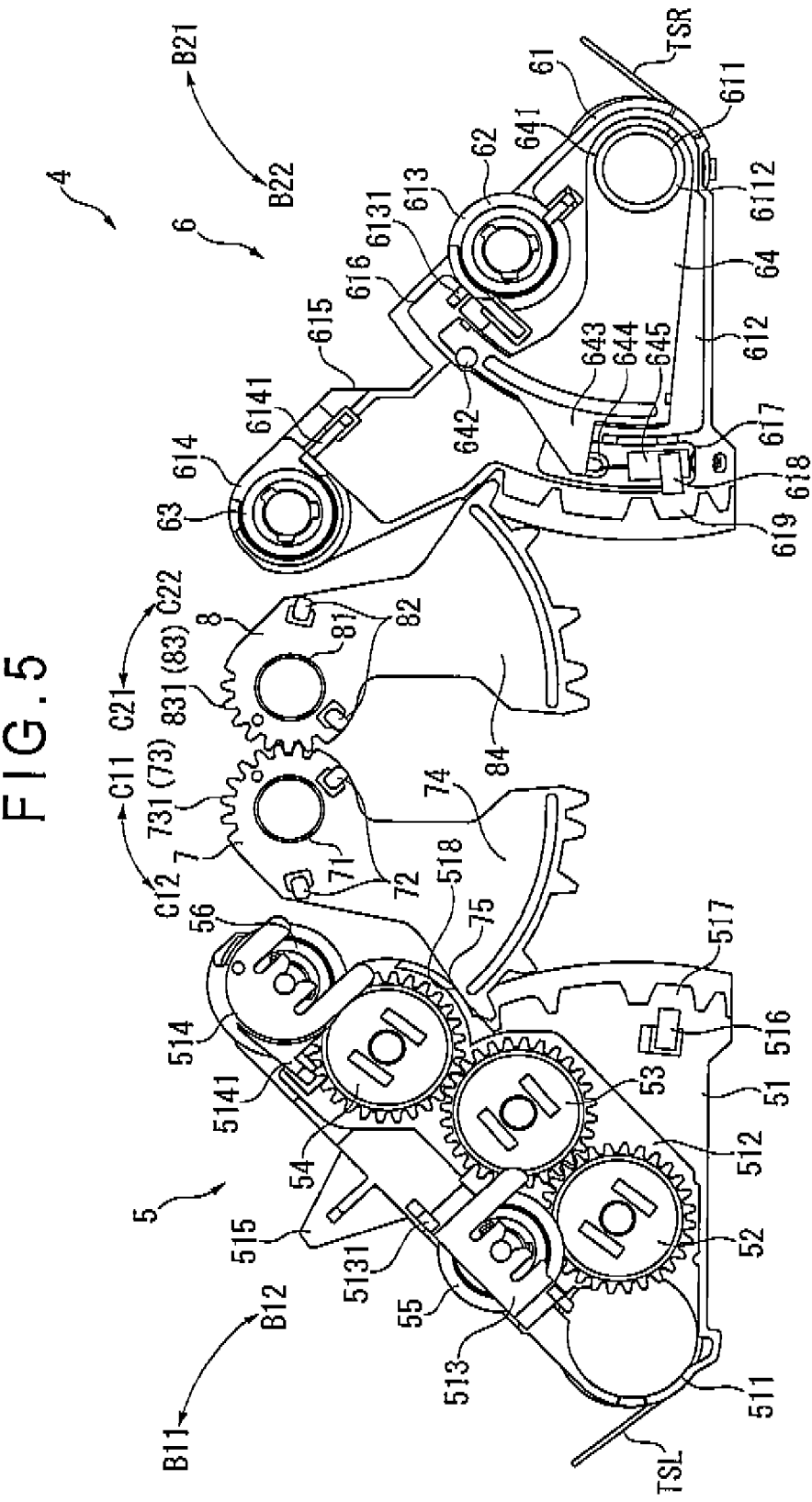

FIG. 5 shows the transport unit 4. It is to be noted that the bracket 9 is omitted in FIG. 5 for the convenience of illustration.

The front arms 5 and 6 are mounted for pivotal motion on the arm attaching portion 92 formed on the left side and the arm attaching portion 93 formed on the right side of the bracket 9 as viewed from the upper face side of the bracket 9 with the recessed portion 91 positioned downwardly, respectively. The front arms 5 and 6 are attached from the lower face side to the arm attaching portions 92 and 93, respectively.

More particularly, the front arms 5 and 6 are mounted for pivotal motion in directions in which they are spaced away from the recessed portion 91, that is, in directions indicated by arrow marks B11 and B21 which are first and second directions, respectively, and different directions in which they approach the recessed portion 91, that is, in directions indicated by arrow marks B12 and B22. The front arms 5 and 6 carry the disk D inserted from the opening 30 into the inside of the apparatus body 3 and carry out the disk D accommodated in the apparatus body 3 to the outside of the opening 30.

The front arms 5 and 6 correspond to first and second arms. More particularly, where the front arm 6 functions as the first arm, the front arm 5 functions as the second arm, but where the front arm 6 functions as the second arm, the front arm 5 functions as the first arm.

[Detailed Configuration of the Front Arm 5]

Referring to FIG. 5, the front arm 5 includes an arm body 51 in the form of a flat plate, three gear wheels 52 to 54, a first roller 55 and a second roller 56.

The arm body 51 has a right-angled isosceles triangular shape and is attached to the bracket 9 such that one of two sides between which the substantially right-angled angle of the substantially right-angle isosceles triangular shape is included extends along the recessed portion 91 of the bracket 9 and the substantially right-angled angle is positioned rather near to the center of the recessed portion 91.

The arm body 51 has an opening 511 of a substantially circular shape, a recessed portion 512, a first roller support portion 513, a second roller support portion 514, an extension 515, a hooked portion 516, a meshing portion 517 and an contacting portion 518 formed thereon.

The opening 511 is formed adjacent an end portion of the arm body 51 along the recessed portion 91 on the opposite side to the substantially right-angled portion. The support portion formed on the lower face side of the arm attaching portion 92 is fitted in the inner side of the opening 511. Further, one of the gear wheels of the transmission mechanism 346 placed on the base frame 341 is positioned on the inner side of the opening 511, and rotation of the gear wheel is transmitted to the gear wheel 52 disposed in the recessed portion 512. Further, an annular portion (not shown) around which the torsion spring TSL hereinafter described is wrapped is formed on an outer edge of the lower face side of the opening 511.

The recessed portion 512 is formed on an upper face of the arm body 51 opposing to the lower face of the bracket 9, and the gear wheels 52 to 54 are mounted for rotation on the recessed portion 512.

The first roller support portion 513 and the second roller support portion 514 are individually formed on an oblique edge portion of the arm body 51, and the first roller support portion 513 is formed substantially at the center of the oblique edge portion while the second roller support portion 514 is formed on the oblique edge portion on the opposite side to the opening 511. The first roller support portion 513 and the second roller support portion 514 support the first roller 55 and the second roller 56 hereinafter described for rotation thereon.

Further, extensions 5131 and 71141 are formed on the first roller support portion 513 and the second roller support portion 514 in such a manner as to extend along an upper face of the arm body 51, respectively. The extensions 5131 and 71141 slidably move along an outer edge of the opening 921 of the bracket 9 and the offset portion 924, respectively, when the arm body 51 is pivoted along the bracket 9.

The extension 515 is formed between the first roller support portion 513 and the second roller support portion 514 such that it extends in a direction in which it is spaced away from the center of the arm body 51. Though not shown, a projection is formed on the lower face of the extension 515 opposing to the base frame 341 such that it projects perpendicularly to the plane. When the disk D is carried in and comes to a position corresponding to the turntable 3211 by the front arms 5 and 6, the projection is fitted into one of the grooves 34311 of the slide cam 3431 described hereinabove to keep the front arms 5 and 6 in a state spaced away from the disk D.

The hooked portion 516 is formed in a substantially L shape as viewed in side elevation on the upper face of the arm body 51. The hooked portion 516 contacts with a offset portion 923 formed on the arm attaching portion 92 of the bracket 9.

Figure 6:
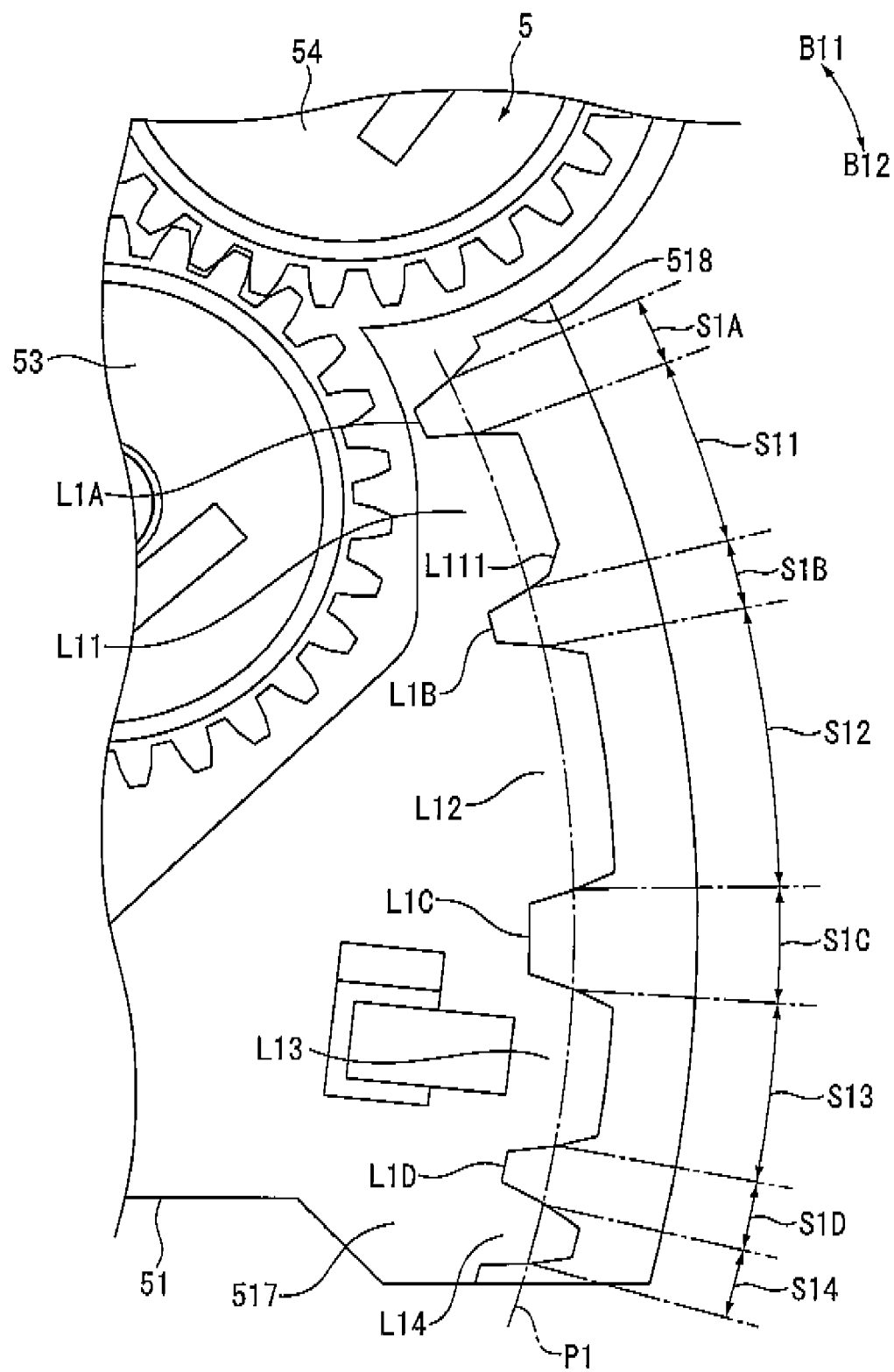
FIGS. 6 and 7 are partial enlarged views showing different ones of two front arms of the transport unit of FIG. 4.

FIG. 6 shows the meshing portion 517 and the contacting portion 518 of the front arm 5 in an enlarged scale.

The meshing portion 517 is formed in a substantially arcuate shape centered at the center of the opening 511 at a position of the arm body 51 corresponding to the substantially right-angled portion. A plurality of grooves L1A to L1D are formed on the meshing portion 517 as seen in FIG. 6 while a plurality of teeth L11 to L14 are formed between adjacent ones of the grooves L1A to L1D, respectively.

More particularly, the groove L1A is formed at an end portion of the meshing portion 517 on the leading side in the direction indicated by an arrow mark B11 which is the pulling-in direction of the disk D. The tooth L11 is formed on the leading side of the meshing portion 517 in the direction indicated by an arrow mark B12 which is the opposite direction to the direction of the arrow mark B11 from the groove L1A such that it commonly has a slanting face of the groove L1A on the disk carrying-out side. Further, the grooves L1B to L1D and the teeth L12 to L14 are formed alternately along the direction indicated by the arrow mark B12 on the meshing portion 517 from the tooth L11.

An moderately inclined portion L111 is formed at an end portion of the tooth L11 on the leading side in the direction indicated by the arrow mark B12 such that it moderates the inclination from an upper portion of the tooth L11 toward the groove L1B. It is to be noted that the tooth L12 corresponds to the arm side first tooth, the tooth L13 to the arm side second tooth, and the tooth L11 to the arm side third tooth.

From among the groove widths S1A to S1D of the grooves L1A to L1D on a pitch circle P1 of the grooves L1A to L1D, that is, on the pitch circle P1 which is centered at the center of the opening 511 and passes middle points between the bottoms of the grooves L1A to L1D and the top portions of the teeth L11 to L14, the groove widths S1A, S1B and S1D are substantially same as each other. Meanwhile, the groove width S1C of the groove L1C has a dimension substantially equal to twice that of the groove widths S1A, S1B and S1D. It is to be noted that the groove width S1C may be set greater than the groove width S23 of the tooth L23 which is the link side first tooth of the link gear 7 hereinafter described but is smaller than the distance between an end face in the form of an inclined face of the tooth L23 on the leading side in the direction indicated by an arrow mark C11 and an end face in the form of an inclined face of the tooth L24 which is the link side second tooth, that is, the dimension of the sum total of the groove width S23, groove width S2C and tooth width S24.

Further, the tooth widths S11 to S14 of the teeth L11 to L14 on the pitch circle P1 are set in response to the groove widths S2A to S2D (refer to FIG. 8) of the grooves L2A to L2D of the link gear 7 hereinafter described.

The contacting portion 518 is formed in an arc centered at the center of the gear wheel 54 adjacent the meshing portion 517. The contacting portion 518 contacts with a contacting portion 75 (FIG. 8) of the link gear 7 in a state wherein the meshing portion 517 of the front arm 5 is positioned most to the opening 30 side. The state mentioned is hereinafter referred to as "non-pivoted state).

Referring back to FIG. 5, the gear wheels 52 to 54 are disposed for rotation on the recessed portion 512 of the arm body 51 as described hereinabove and transmit rotation of the gear wheels of the transmission mechanism 346 described hereinabove to the first roller 55 and the second roller 56. The gear wheel 52 meshes with one of the gear wheels of the transmission mechanism 346 and further meshes with the gear wheel 53 and the first roller 55. Further, the gear wheel 54 which meshes with the gear wheel 53 also meshes with the second roller 56. Therefore, the first roller 55 and the second roller 56 rotate in the same direction.

The first roller 55 and the second roller 56 are supported for rotation on the first roller support portion 513 and the second roller support portion 514 of the arm body 51 described hereinabove, respectively, and grasp the disk D inserted from the opening 30 of the apparatus body 3 to transport the disk D.

Rubber rollers (not shown) having a shape of a combination of conical trapezoidal shapes for grasping the disk D are attached to the first roller 55 and the second roller 56.

[Detailed Configuration of the Front Arm 6]

Referring to FIG. 5, the front arm 6 includes an arm body 61, a first roller 62, a second roller 63 and a detection lever 64.

The arm body 61 is a member in the form of a flat plate having a right-angled isosceles shape as viewed in plan similarly to the arm body 51. The arm body 61 is attached to the lower face of the arm attaching portion 93 such that one of two sides between which the substantially right-angled portion is included extends along the recessed portion 91 of the bracket 9 and the substantially right-angled portion is positioned rather near to the center of the recessed portion 91.

Openings 611, 616 and 617, a recessed portion 612, a first roller support portion 613, a second roller support portion 614, a cutaway portion 615, a hooked portion 618 and a meshing portion 619 are formed on the arm body 61.

The opening 611 is formed adjacent an end portion of the arm body 61 along the recessed portion 91 on the opposite side to the above-described substantially right-angled portion. One of the support portions described hereinabove formed on the arm attaching portion 93 is fitted in the inside of the opening 611. Further, an annular portion (not shown) around which the torsion spring TSR is wrapped is formed around the lower face side of the opening 611. Furthermore, an annular portion 6112 to which the detection lever 64 is mounted for pivotal motion is formed on an outer edge of the upper face side of the opening 611.

The recessed portion 612 is formed substantially at the center of the upper face of the arm body 61, and the detection lever 64 is disposed on the recessed portion 612.

The first roller support portion 613 and the second roller support portion 614 are formed on an oblique side portion of the arm body 61 and support the first roller 62 and the second roller 63, respectively. In particular, the first roller support portion 613 is formed at a substantially central portion of the oblique side portion while the second roller support portion 614 is formed at an end portion on the opposite side to the opening 611. The first roller support portion 613 is exposed to the upper face side of the bracket 9 through the opening 931 of the bracket 9.

Here, thought not particularly shown, the first roller 62 and the second roller 63 have rubber rollers having a substantially cylindrical shape for contacting with an end edge of the disk D. The rubber rollers are supported for rotation on the first roller support portion 613 and the second roller support portion 614.

By the configuration described, the first roller 55 and the second roller 56 of the front arm 5 and the first roller 62 and the second roller 63 of the front arm 6 are disposed substantially symmetrical with respect to a straight line which passes the center of the bracket 9 in the longitudinal direction and extends perpendicularly to the longitudinal direction.

Further, extensions 6131 and 6141 are formed on the first roller support portion 613 and the second roller support portion 614, respectively, and extend along the upper face of the arm body 61. When the arm body 61 is attached to the bracket 9, the extensions 6131 and 6141 contact with an outer edge of the opening 931 and the offset portion 934 thereby to prevent the arm body 61 from coming off from the bracket 9.

The cutaway portion 615 is formed between the first roller support portion 613 and the second roller support portion 614 by being cut away toward the center of the arm body 61. This cutaway portion 615 inputs a switch (not shown) of the control board 345 (refer to FIG. 3) hereinabove described provided on the base frame 341 when the front arm 6 supported on the bracket 9 is pivoted in a direction away from the front arm 5 in response to insertion of the disk D. Consequently, the control unit 31 described hereinabove connected to the control board 345 detects the amount of pivotal motion of the front arm 6.

Further, the substantially rectangular cutaway portion 616 is formed between the first roller support portion 613 and the cutaway portion 615. A pressing portion (not shown) of the detection lever 64 provided on the upper face side of the arm body 61 is exposed to the lower face side of the arm body 61 through the cutaway portion 616.

The opening 617 is formed substantially in an arc centered at the center of the opening 611, and a tension spring 645 for the detection lever 64 hereinafter described is disposed in the inside of the opening 617.

The hooked portion 618 is formed in a substantially L shape as viewed in side elevation in an adjacent relationship to the opening 617. When the arm body 61 is attached to the bracket 9, the hooked portion 618 contacts at an end portion thereof with the offset portion 933 (refer to FIG. 4) of the bracket 9 to prevent coming off of the arm body 61 from the bracket 9.

Figure 7:
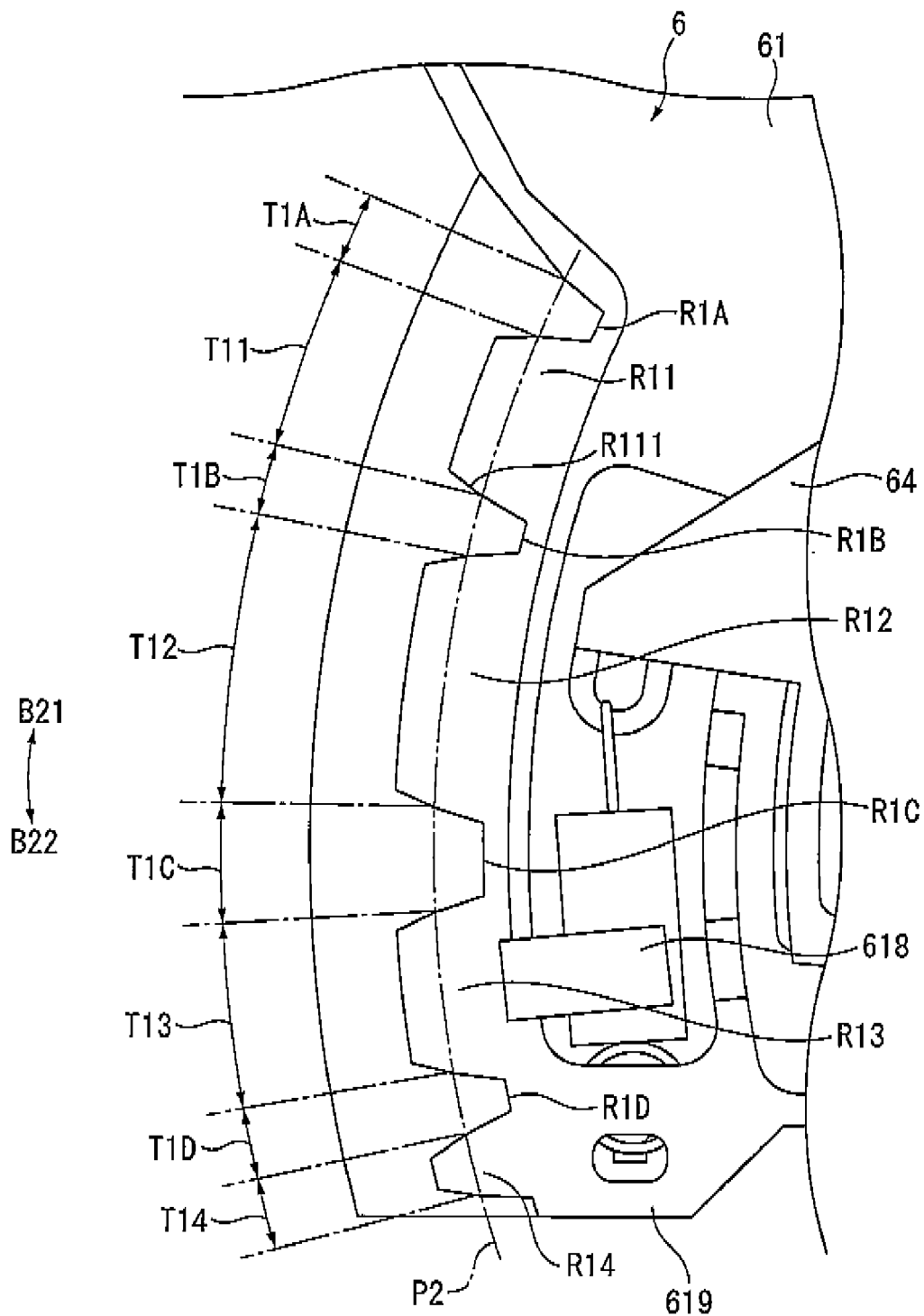

FIG. 7 shows the meshing portion 619 of the front arm 6 in an enlarged scale.

The meshing portion 619 is formed substantially in an arc centered at the center of the opening 611 at a position of the arm body 61 opposing to the substantially right-angled portion. A plurality of grooves R1A to R1D and a plurality of teeth R11 to R14 are formed alternately on the meshing portion 619 with the inclined face shared thereamong as seen in FIG. 7 similarly as in the case of the meshing portion 517 of the front arm 5 described hereinabove. The grooves R1A to R1D and the teeth R11 to R14 contact with teeth R21 to R25 and grooves R2A to R2D (refer to FIG. 9) formed on the link gear 8 hereinafter described, respectively.

More particularly, the groove R1A is formed at an end portion of the meshing portion 619 on the leading side in the direction of the arrow mark B21 which is the disk pulling-in direction, and the tooth R11 is formed on the meshing portion 619 on the leading side in the direction of the arrow mark B22 which is the opposite direction to that of the arrow mark B21 with respect to the tooth R11 while the inclined face of the groove R1A on the disk carrying-out side is shared commonly. The grooves R1B to R1D and the teeth R12 to R14 are formed alternately on the meshing portion 619 along the direction of the arrow mark B22 from the tooth R11.

The tooth R12 corresponds to the arm side first tooth; the tooth R13 to the arm side second tooth; and the tooth R11 to the arm side third tooth. Further, an inclined portion R111 is formed at an end portion of the tooth R11 on the leading side in the direction of the arrow mark B22 similarly to the tooth L11 described hereinabove.

Here, the groove widths T1A, T1B and T1D are set to a substantially same size from among the groove widths T1A to T1D of the grooves R1A to R1D on a pitch circle P2 which is centered at the center of the opening 611 and passes middle positions between the bottom portions of the grooves R1A to R1D and the ends of the teeth R11 to R14, and the groove width T1C is set to a dimension substantially equal to twice that of the groove width T1A. It is to be noted that the groove width T1C may be set greater than the tooth width T23 of the tooth R23 which is the link side first tooth of the link gear 8 hereinafter described but smaller than the dimension between an end face in the form of an inclined face of the tooth R23 on the leading side in the direction of an arrow mark C21 and an end face in the form of an inclined face of the tooth R24 which is the link side second tooth on the leading side in the direction of an arrow mark C22, that is, the dimension of the sum of the tooth width T23, groove width T2C and tooth width T24.

Further, the tooth widths T11 to T14 of the teeth R11 to R14 on the pitch circle P2 are set in response to the groove widths T2A to T2D (refer to FIG. 9) of the grooves R2A to R2D of the link gear 8 hereinafter described.

Further, the tooth widths T11 to T14 and the groove widths T1A to T1D are equal to the tooth widths S11 to S14 of the teeth L11 to L14 formed on the front arm 5 and the groove widths S1A to S1D of the grooves L1A to L1D.

Referring back to FIG. 4, the detection lever 64 is disposed in the recessed portion 612 of the arm body 61 and mounted for pivotal motion on the annular portion 6112 of the arm body 61. The detection lever 64 contacts with an end edge of the disk D and is pivoted around the annular portion 6112 to input the switch for disk insertion detection provided on the control board 345 described hereinabove.

The detection lever 64 is a member in the form of a flat plate formed in a substantially L shape as viewed in plan. The detection lever 64 has an opening 641, a contacting pin 642, a pressing portion (not shown), an extension 643 and an attaching portion 644 formed thereon, and a tension spring 645 is provided on the detection lever 64.

The opening 641 is formed in a substantially circular shape as viewed in plan on one end portion side of the detection lever 64, and the annular portion 6112 is fitted in the opening 641.

The contacting pin 642 is formed as a pin at an end portion of the detection lever 64 on the opposite side to the side in which the opening 641 is formed in such a manner as to project in a direction perpendicular to the plane from the upper face of the detection lever 64, that is, the face opposite to the side which opposes to the arm body 61. The contacting pin 642 is exposed to the upper face side of the bracket 9 through the hole portion 935 of the bracket 9 and contacts with an end edge of the disk D inserted in the opening 30. Then, the detection lever 64 is pivoted around the opening 641 in response to pushing-in of the disk D contacting with the contacting pin 642.

The pressing portion (not shown) is formed on the lower face side of the detection lever 64 opposing to the arm body 61 and is exposed to the lower face side of the arm body 61 through the cutaway portion 616 described hereinabove. The pressing portion inputs the switch for disk insertion detection in response to pivotal motion of the detection lever 64.

The extension 643 is formed at an end portion of the detection lever 64 on the side on which the contacting pin 642 is formed and extends in a direction away from the center of the detection lever 64. The attaching portion 644 of a substantially U shape as viewed in plan is formed at an end of the extension 643, and the tension spring 645 provided in the opening 617 of the arm body 61 is mounted at one end thereof to the attaching portion 644. The other end of the tension spring 645 is attached to the arm body 61, and the detection lever 64 is biased in a direction toward the recessed portion 91 of the bracket 9 by the tension spring 645.

[Configuration of the Link Gear Wheels 7 and 8]

The link gears 7 and 8 are members each in the form of a flat plate and attached to the link attaching portion 94 of the bracket 9 such that they mesh with each other. The link gears 7 and 8 mesh with the meshing portions 517 and 619 of the front arms 5 and 6, respectively, and are rotated in response to pivotal motion of one of the front arms 5 and 6 to pivot the other one of the front arms 5 and 6 in the opposite direction to that of the one of the front arms 5 and 6. The link gears 7 and 8 correspond to a first link gear wheel and a second link gear wheel. More particularly, where the front arm 5 functions as the first arm, the link gear 7 corresponds to the first link gear and the link gear 8 corresponds to the second link gear. On the other hand, where the front arm 6 functions as the first arm, the link gear 7 corresponds to the second link gear and the link gear 8 corresponds to the first link gear.

Figure 8:
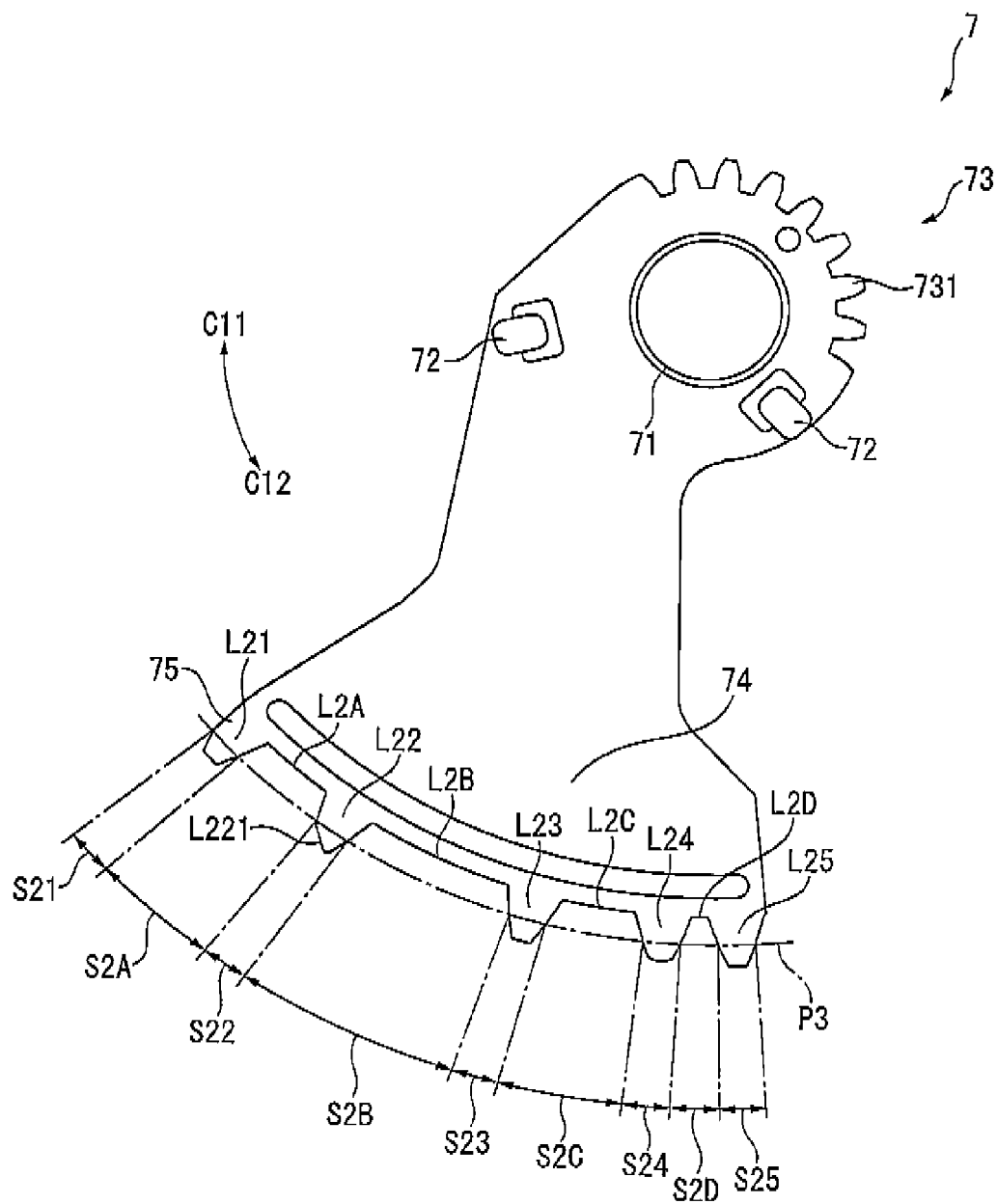
FIGS. 8 and 9 are plan views showing different ones of two link gear wheels of the transport unit of FIG. 4.

FIG. 8 shows the link gear 7.

Referring to FIG. 8, an opening 71 of a substantially circular shape as viewed in plan is formed on one end portion side of the link gear 7. A support portion of a substantially circular shape formed on the link attaching portion 94 of the bracket 9 is fitted in the opening 71 so that the link gear 7 is supported for pivotal motion on the bracket 9. The axis of pivotal motion of the link gear 7 is set to a direction along the axes of pivotal motion of the front arms 5 and 6.

Two hooked portions 72 of a substantially L shape as viewed in side elevation are formed around the opening 71 of the upper face of the link gear 7 opposing to the bracket 9 such that they contact with the upper face of the offset portion 942 of the bracket 9.

An arcuate meshing portion 73 centered at the center of the opening 71 is formed on an outer periphery of the link gear 7 on the side on which the opening 71 is formed. A plurality of teeth 731 are formed on the meshing portion 73 for meshing with a plurality of teeth 831 formed on the link gear 8.

A meshing portion 74 is formed in an arc centered at the center of the opening 71 at an end portion of the link gear 7 opposite to the side on which the opening 71 is formed for meshing with the meshing portion 517 of the front arm 5.

A plurality of teeth L21 to L25 and a plurality of grooves L2A to L2D are formed alternately on the meshing portion 74.

More particularly, the tooth L21 is formed at an end portion of the meshing portion 74 on the leading side in the direction in which the link gear 7 is rotated, that is, in the direction of the arrow mark C11 which is a third direction and a fourth direction, when the front arm 5 is pivoted in the direction of the arrow mark B11. Meanwhile, the groove L2A is formed on the reading side of the meshing portion 74 in the direction of an arrow mark C12 which is the opposite direction to the direction of the arrow mark C11 with respect to the tooth L21. The teeth L22 to L25 and the grooves L2B to L2D are formed alternately on the meshing portion 74 along the direction indicated by the arrow mark C12 from the groove L2A.

The teeth L22 to L24 correspond to a link side third tooth, a link side first tooth and a link side second tooth, respectively, and the cutaway portion L221 is formed on the leading side of the tooth L22 in the direction of the arrow mark C11. Further, an end of the tooth L22 is formed at an acute angle when compared with the teeth L21 and L23 to L25. Further, an end portion of the tooth L24 is formed in a substantially arcuate shape.

Here, the tooth widths S21 to S25 of the teeth L21 to L25 on a pitch circle P3 which is centered at the center of the opening 71 and passes middle points between the ends of the teeth L21 to L25 and the bottoms of the grooves L2A to L2D are substantially equal to each other and are substantially equal to the grooves L1A, L1B and L1D formed on the front arm 5 described hereinabove.

Meanwhile, from among the groove widths S2A to S2D of the grooves L2A to L2D on the pitch circle P3, the groove width S2A of the groove L2A has a dimension with which, when one of the teeth L21 and L22 is inserted into a corresponding one of the grooves L1A and L1B of the front arm 5, before the one tooth and the corresponding groove are spaced away from each other, the other tooth and the other groove can engage with each other.

On the other hand, the groove width S2B of the groove L2B is set to a dimension with which, when the tooth L23 of the link gear 7 and the groove L1C of the front arm 5 are engaged with each other, the tooth L22 and the groove L1B are disengaged from each other. However, when the tooth L23 and the groove L1C are disengaged from each other, the tooth L22 and the groove L1B are engaged with each other. In other words, the dimension of the groove width S2B is set so as to satisfy the two conditions described.

The groove width S2C of the groove L2C is set shorter than the groove width S2B and set to a dimension with which, when an end face of the tooth L23 on the leading side in the direction of the arrow mark C12 and an end face of the groove L1C of the front arm 5 on the arrow mark B12 side are brought into contact with each other, the tooth L24 is inserted into the groove L1D.

The contacting portion 75 is formed on an end edge of the meshing portion 74 on the leading side in the direction of the arrow mark C11 and contacts, when the front arm 5 is in the non-pivoted state described hereinabove, with the contacting portion 518 of the front arm 5. In this state, the tooth L21 of the meshing portion 74 is inserted in the groove L1A of the front arm 5.

Figure 9:
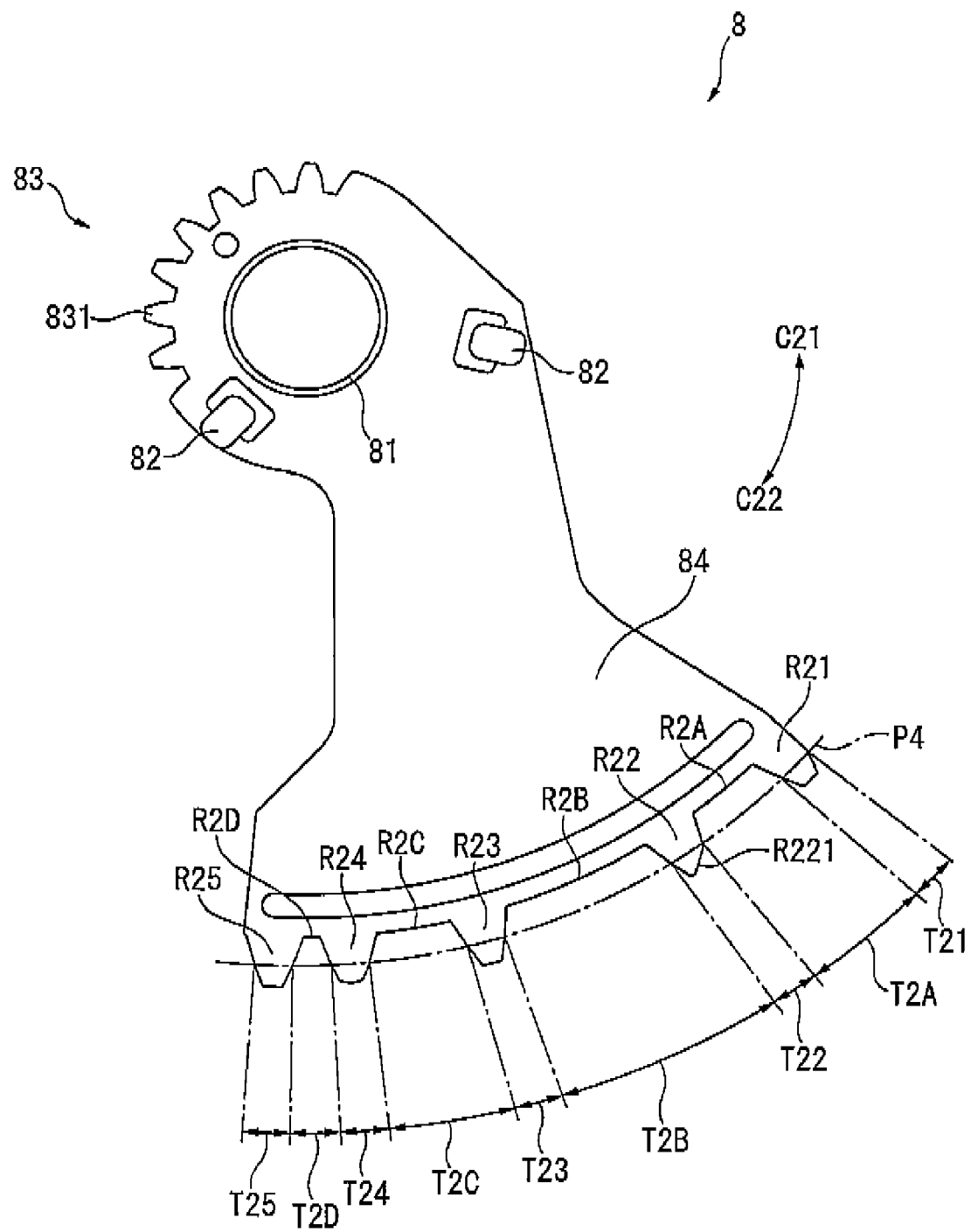

FIG. 9 shows the link gear 8.

Referring to FIG. 9, the link gear 8 is a member in the form of a flat plate having a substantially mirror symmetrical structure to that of the link gear 7. The link gear 8 has an opening 81 in which a support portion formed on the link attaching portion 94 is fitted, two hooked portions 82 which contact with the offset portion 944, and a meshing portion 83 formed in an arc centered at the center of the opening 81 and having a plurality of teeth 831 thereon. The link gear 8 further has a meshing portion 84 formed in an arc centered at the center of the opening 81 on the opposite side to the meshing portion 83 and meshing with the meshing portion 619 of the front arm 6. The opening 81, hooked portions 82 and meshing portions 83 and 84 are formed at positions of the link gear 9 similar to those of the link gear 7 as seen in FIG. 9.

In this instance, a plurality of teeth R21 to R25 and a plurality of grooves R2A to R2D are formed on the meshing portion 84.

More particularly, the tooth R21 is formed at an end portion of the meshing portion 84 on the leading side in the direction of pivotal motion of the link gear 8 when the front arm 6 is pivoted. Meanwhile, the groove R2A is formed on the meshing portion 84 adjacent the tooth R21 on the leading side in the direction of the arrow mark C22 which is the opposite direction to that of the arrow mark C21. Further, the teeth R22 to R25 and the grooves R2B to R2D are formed alternately on the meshing portion 84 along the direction of the arrow mark C22 from the groove R2A. The teeth R22 to R24 correspond to the link side third tooth, link side first tooth and link side second tooth, respectively. Meanwhile, a cutaway portion R221 is formed on the bottom cover R22 on the leading side in the direction of the arrow mark C21, and an end of the tooth R24 is formed substantially in an arc similarly to the tooth L22 described hereinabove.

Here, similarly to the meshing portion 74 described hereinabove, the tooth widths T21 to T25 of the teeth R21 to R25 and the groove widths T2A to T2D of the grooves R2A to R2D on a pitch circle P4 which is centered at the center of the opening 81 and passes middle points between the ends of the teeth R21 to R25 and the bottoms of the grooves R2A to R2D are set to substantially same dimensions as those of the tooth widths S21 to S25 of the teeth L21 to L25 and the groove widths S2A to S2D of the grooves L2A to L2D on the pitch circle 23 of the link gear 7, respectively, similarly as in the case of the meshing portion 74 described hereinabove.

[Configuration of the Torsion Springs TSL and TSR]

The torsion springs TSL and TSR bias the front arms 5 and 6 in directions in which the front arms 5 and 6 approach the recessed portion 91 side of the bracket 9, that is, in the directions of the arrow marks B12 and B22 which are the opening 30 side of the disk apparatus 1. Though not particularly shown, each of the torsion springs TSL and TSR has a coiled portion wrapped around an annular portion (not shown) of the corresponding one of the front arms 5 and 6 and a pair of linear portions extending from the coiled portion. One of the linear portions of each of the torsion springs TSL and TSR is anchored at the arm body 51 or 61 while the other linear portion is anchored at the bracket 9.

Here, the biasing force of the torsion spring TSL acting upon the front arm 5 is lower than the biasing force of the torsion spring TSR acting upon the front arm 6. Therefore, the disk D is transported along a portion rather near to the front arm 5 with respect to the center between the front arms 5 and 6. However, since the turntable 3211 described hereinabove is positioned on a transport path of the disk D, chucking of the turntable 3211 and the disk D is carried out appropriately. Since the torsion springs TSL and TSR are different in biasing force from each other in this manner, play of the front arms 5 and 6 upon pivotal motion of the front arms 5 and 6, that is, upon transportation of the disk D, can be prevented when compared with that in an alternative case wherein the torsion springs TSL and TSR are equal in biasing force to each other. Consequently, the disk D can be inserted appropriately to a position corresponding to the turntable 3211.

[Transportation of the First Disk D1 by the Transport Unit 4]

In the following, transportation of the disk D by the transport unit 4 is described.

Figure 10:
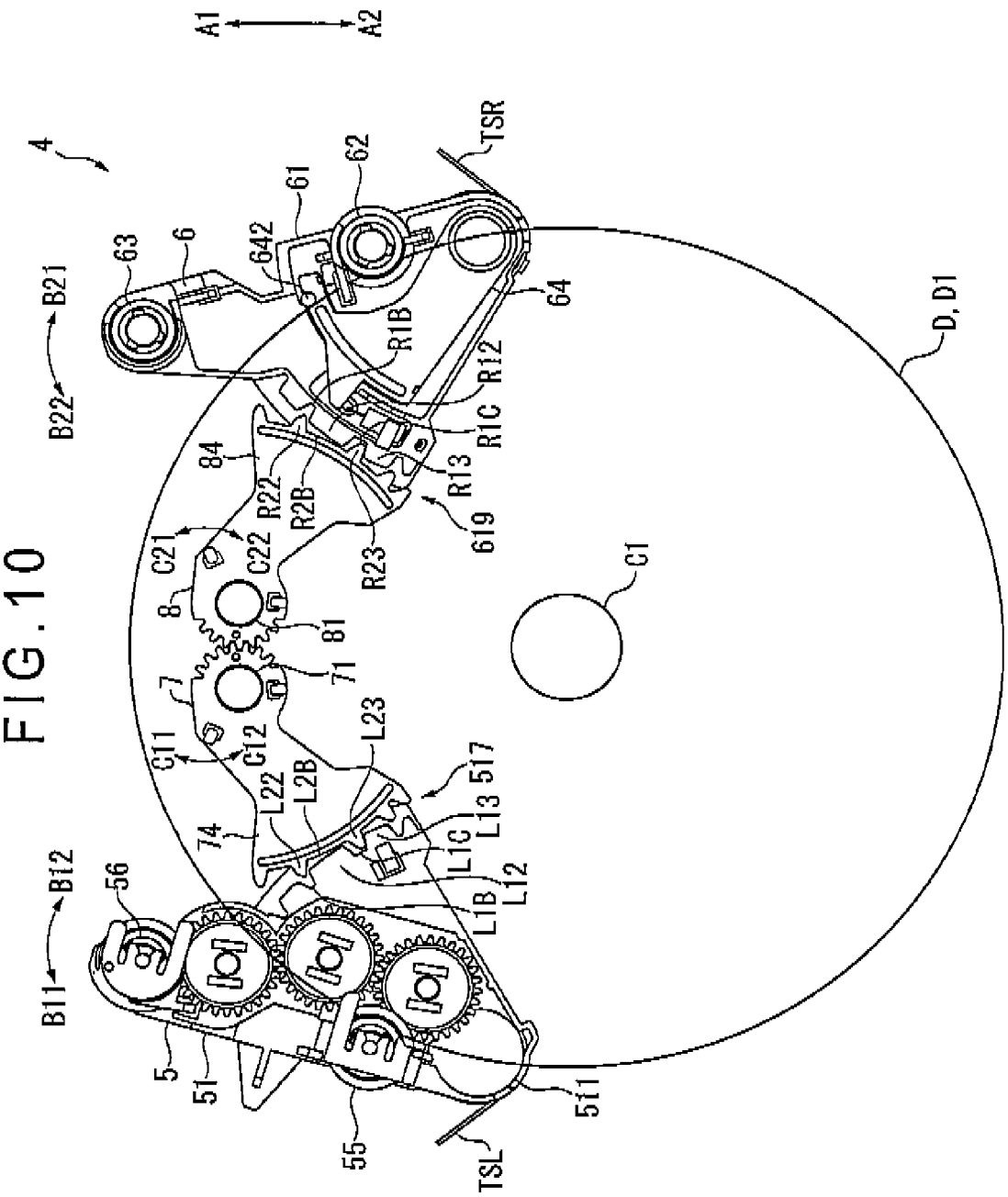
FIGS. 10 and 11 are plan views illustrating different stages of a process of transportation of a first disk by the transport unit of FIG. 4.
Figure 11:
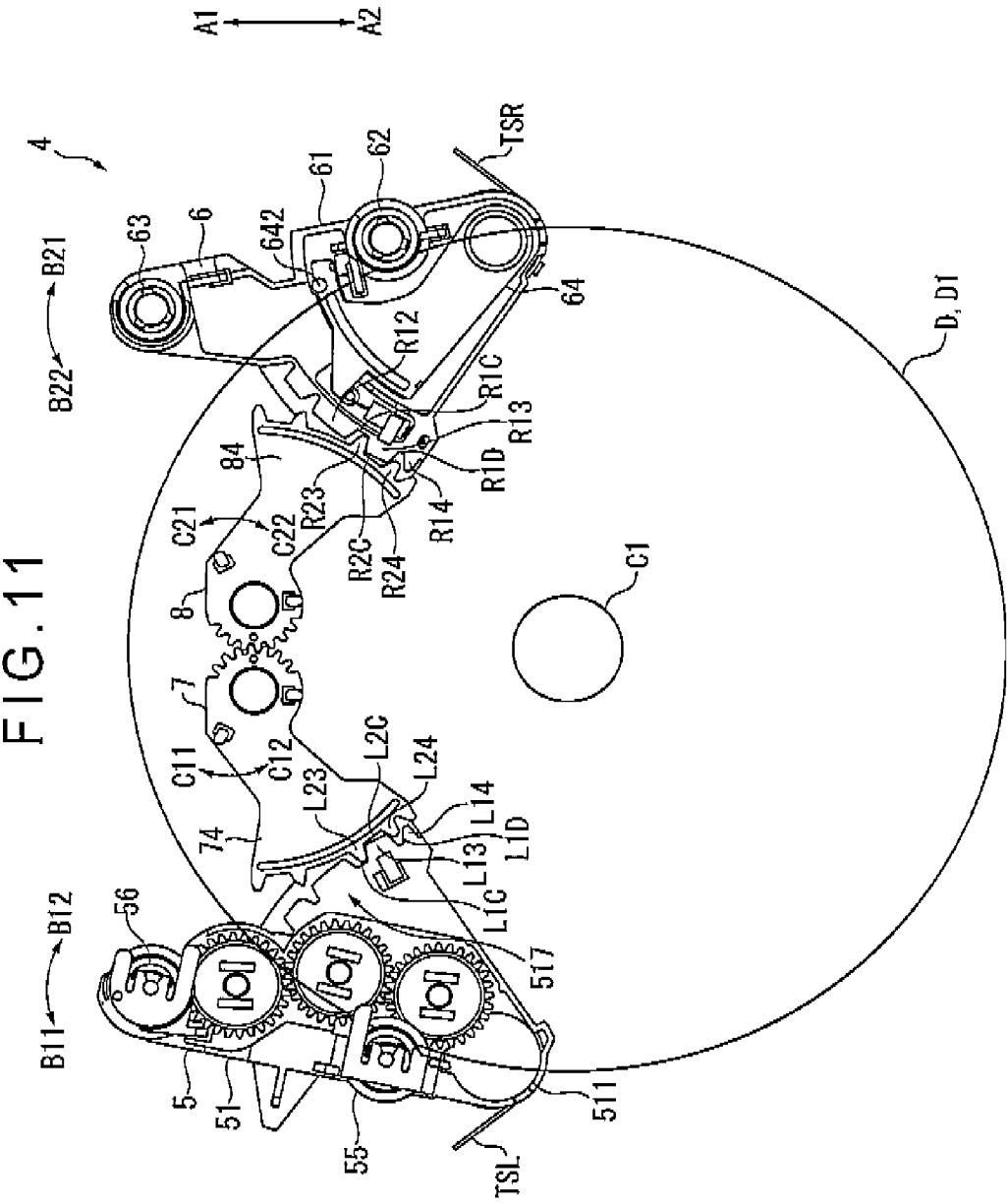

FIGS. 10 and 11 illustrate a process in which a first disk D1 is transported by the transport unit 4. It is to be noted that, in FIGS. 10 to 16, the bracket 9 is not shown.

If a first disk D1 having a diametrical dimension substantially equal to that of the opening 30 is inserted into the opening 30 when the front arms 5 and 6 are in the non-pivoted state, then an end edge of the first disk D1 is first brought into contact with the contacting pin 642 of the detection lever 64 provided on the front arm 6 to pivot the detection lever 64 in the direction indicated by the arrow mark B21. Consequently, the switch for disk insertion detection on the control board 345 is inputted. Thus, the control unit 31 detects the insertion of the first disk D1 into the opening 30 to drive the motor 344, and the first roller 55 and the second roller 56 of the front arm 5 are rotated by the motor 344.

Thereafter, if the first disk D1 is inserted into the interior of the opening 30, then the end edge of the first disk D1 is gripped by the first rollers 55 and 62 of the front arms 5 and 6.

Then, by rotation of the first roller 55, the front arms 5 and 6 are pivoted in the directions of the arrow marks B11 and B21 while pulling the first disk D1 in the direction indicated by the arrow mark A1 into the inside of the apparatus body 3.

Consequently, the tooth L11 of the front arm 5 is inserted into the groove L2A between the teeth L21 and L22 of the link gear 7 and the tooth R11 of the front arm 6 is inserted into the groove R2A between the teeth R21 and R22 of the link gear 8 while the teeth L22 and R22 of the link gears 7 and 8 are inserted into the grooves L1D and R1B of the front arms 5 and 6, respectively.

If the front arms 5 and 6 and the link gears 7 and 8 are further pivoted and rotated in the directions of the arrow marks B11 and B21 and the arrow marks C11 and C21, respectively, then the teeth L23 and R23 of the link gears 7 and 8 are inserted into the grooves L1C and R1C of the front arms 5 and 6.

Thereupon, the front arms 5 and 6 are pushed in the directions indicated by the arrow marks B11 and B21 against the biasing force of the torsion springs TSL and TSR, respectively. Therefore, end faces of the teeth L13 and R13 of the front arms 5 and 6 on the leading side in the directions of the arrow marks B11 and B21, that is, end faces of the grooves L1C and R1C on the leading side in the directions of the arrow marks 212 and 822, contact with end faces of the teeth L23 and R23 of the link gears 7 and 8 on the leading side in the directions of the arrow marks B12 and B22 to pivot the link gears 7 and 8 in the directions of the arrow marks C11 and C21 in such a manner as to push up the link gears 7 and 8.

It is to be noted that, in the state wherein the teeth L13 and R13 and the teeth L23 and R23 contact with each other in this manner, end faces of the teeth L12 and R12 of the front arms 5 and 6 on the leading side in the directions of the arrow marks B11 and B21 and end faces of the teeth L22 and R22 of the link gears 7 and 8 on the leading side in the directions of the arrow marks C12 and C22 are spaced from each other.

Thereafter, as the first disk D1 is further carried in the direction of the arrow mark A1 and the front arms 5 and 6 are further pivoted in the directions of the arrow marks B11 and B21, then the end faces of the teeth L24 and R24 of the link gears 7 and 8 on the leading side in the directions of the arrow marks C11 and C21 are gradually brought into contact with the end faces of the grooves L1D and R1D of the front arms 5 and 6 on the leading side in the directions of the arrow marks B11 and B21, and the teeth L24 and R24 tend to be fitted into the grooves L1D and R1D. As the front arms 5 and 6 are further pivoted, since the teeth widths S13 and T13 of the teeth L13 and R13 of the front arms 5 and 6 and the groove widths S2C and T2C of the grooves L1C and R1C of the link gears 7 and 8 are substantially equal to each other, the end faces of the teeth L14 and R14 on the leading side in the directions of the arrow marks B11 and B21 and the end faces of the tooth L23 on the leading side in the directions of the arrow marks C12 and C22.

Consequently, the tooth L24 of the link gear 7 is fitted into the groove L1D between the teeth L13 and L14 of the front arm 5 while the tooth R24 of the link gear 8 is fitted into the groove R1D between the teeth R13 and R14 of the front arm 6 thereby to allow further pivotal motion of the front arms 5 and 6 in the directions of the arrow marks B11 and B21, respectively.

Then, the first disk D1 gripped by the first rollers 55 and 62 of the front arms 5 and 6 is inserted in the direction indicated by the arrow mark A1 which is the carrying direction into the apparatus body 3 by rotation of the first roller 55 until it is gripped by the second rollers 56 and 63 of the front arms 5 and C. Then, together with rotation of the second roller 56, the front arms 5 and 6 are further pivoted in the directions indicated by the arrow marks B11 and B21 while the first disk D1 is carried in the direction of the arrow mark A1.

Thereafter, when a hole C1 formed at the center of the first disk D1 comes to a position corresponding to the turntable 3211, the front arms 5 and 6 are locked by the grooves 34311 of the slide cam 3431 described hereinabove in a state wherein the first disk D1 and the second rollers 56 and 63 are spaced away from each other. Consequently, such a situation that the second rollers 56 and 63 disturb rotation of the first disk D1 by the turntable 3211 can be prevented.

By the process described above, the carrying in operation of the first disk D1 into the apparatus body 3 is completed.

Meanwhile, when the first disk D1 is to be carried out from within the apparatus body 3 to the outside of the opening 30, the front arms 5 and 6 and the link gears 7 and 8 operate reversely to carry out the first disk D1 in the direction indicated by the arrow mark A2.

In this instance, upon transition from the state illustrated in FIG. 11 to the state illustrated in FIG. 10, that is, when the front arms 5 and 6 are pivoted in the directions indicated by the arrow marks B12 and B22 to bring the teeth L22 and R22 of the link gears 7 and 8 into meshing engagement with the grooves L1B and R1B of the front arms 5 and 6, depending upon the positional relationship between the grooves L1C and R1C and the teeth L23 and R23, there is the possibility that the teeth L22 and R22 may not be placed into appropriate meshing engagement with the grooves L1B and R1B, respectively. For example, in such a case that the end faces of the grooves L1C and R1C on the leading side in the directions of the arrow marks B12 and B22 and the end faces of the teeth L23 and R23 on the leading side in the directions of the grooves L1C and R1C are held in contact with each other under the biasing force of the torsion springs TSL and TSR, there is the possibility that end portions of the teeth L22 and R22 may abut with ends of the teeth L11 and R11, respectively.

On the other hand, the inclined portions L111 and R111 (refer to FIGS. 6 and 7) are formed on the leading side of the teeth L11 and R11 in the directions of the arrow marks B12 and B22 and the cutaway portions L221 and R221 (refer to FIGS. 8 and 9) are formed on the leading side of the teeth L22 and R22 in the directions of the arrow marks C12 and C22 as described hereinabove, respectively. Therefore, even if the cutaway portions L221 and R221 are contacted with the inclined portions L111 and R111, the teeth L22 and R22 slip into the grooves L1B and R1B, respectively. Consequently, the teeth L22 and R22 are inserted into the grooves L1B and R1B, respectively and pivotal motion of the front arms 5 and 6 in the directions of the arrow marks B12 and B22 and carrying out of the first disk D1 are carried out smoothly.

[Transportation of the Second Disk D2 by the Transport Unit 4]

[Carrying-in of the Second Disk D2 Inserted Centrally into the Opening 30]

Figure 12:
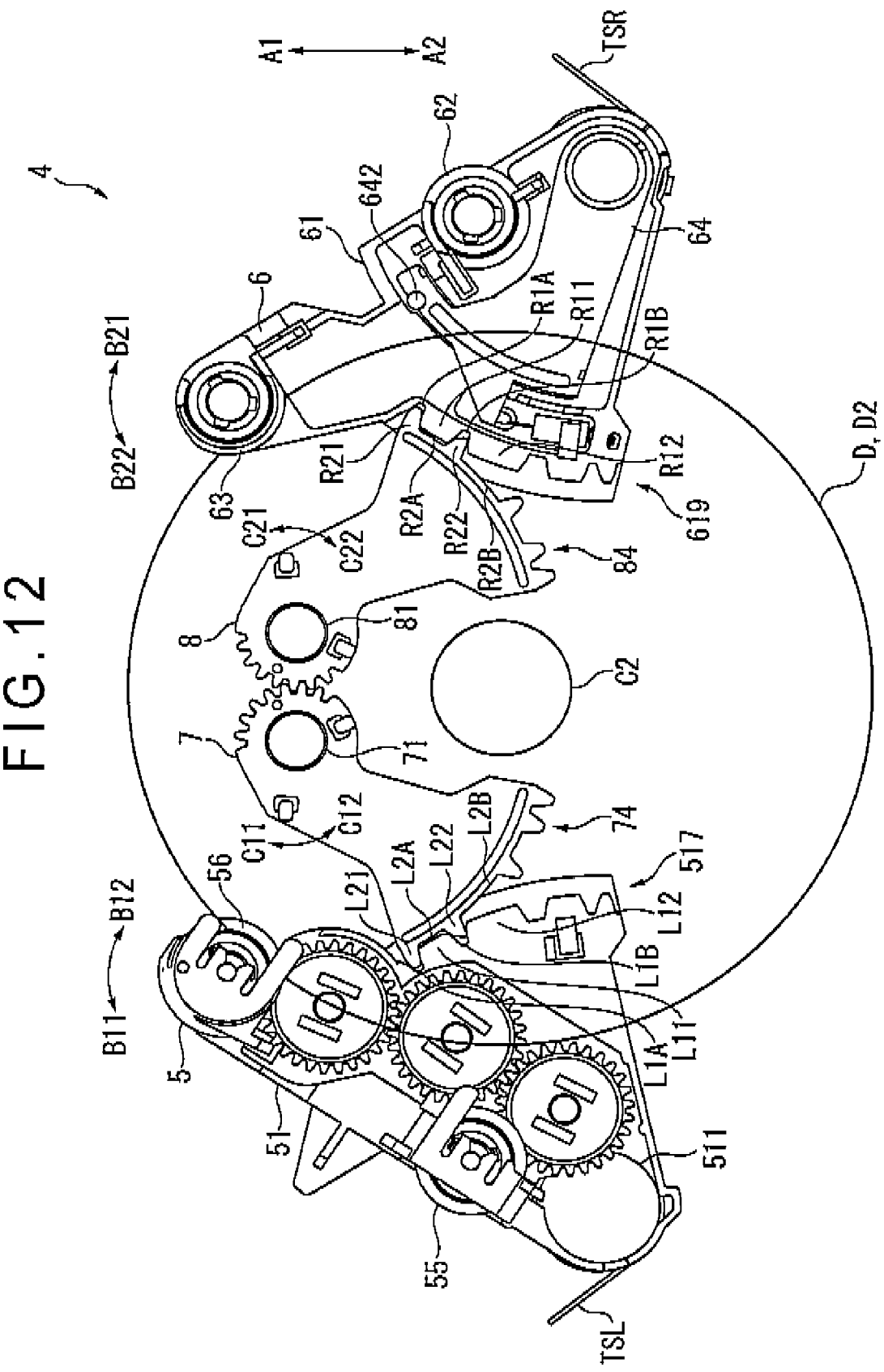
FIGS. 12 to 16 are plan views illustrating different stages of a process of transportation of a second disk by the transport unit of FIG. 4.
Figure 13:
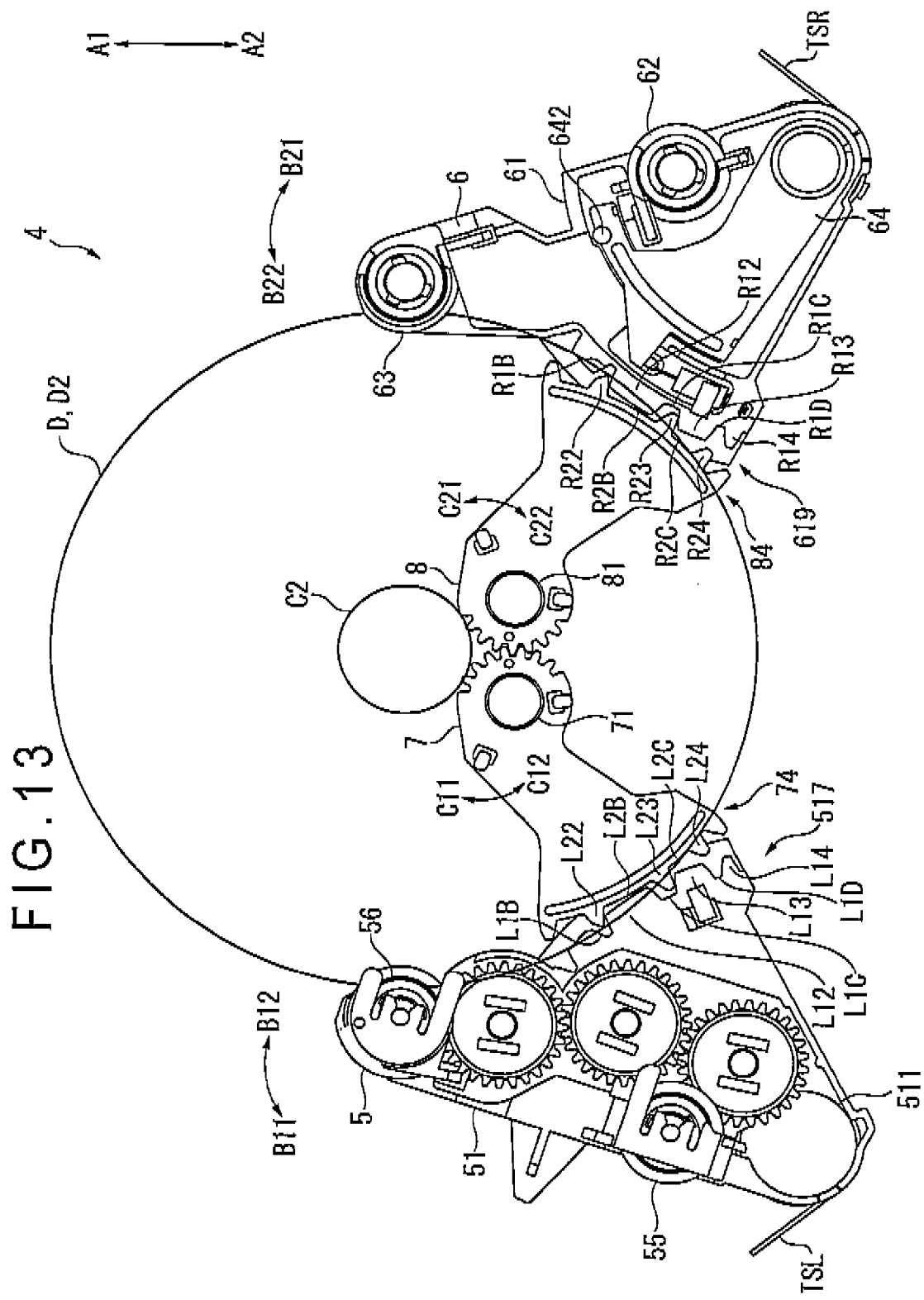

FIGS. 12 and 13 illustrate a process wherein a second disk D2 inserted to a middle position of the opening 30 is transported by the transport unit 4.

If the second disk D2 having a diameter smaller than that of the first disk D1 is inserted to a middle position of the opening 30 while the front arms 5 and 6 are in the non-pivoted state, then an end edge of the second disk D2 is gripped by the second rollers 56 and 63 of the front arms 5 and 6. It is to be noted that, in this state, the second disk D2 does not contact with the contacting pin 642 of the detection lever 64 and no relative pivotal motion of the detection lever 64 to the front arm 6 occurs.

Then, if the second disk D2 is pushed in the direction of the arrow mark A1 into the inside of the apparatus body 3, then the front arms 5 and 6 are pivoted in the directions of the arrow marks B11 and B21 as seen in FIG. 12, respectively. In response to the pivotal motion, end edges of the teeth L11 and R11 of the front arms 5 and 6 on the leading side in the directions of the arrow marks B11 and B21 push up end edges of the teeth L21 and R21 on the leading side in the directions of the arrow marks C12 and C22 to pivot the link gears 7 and 8 in the directions of the arrow marks C11 and C21, respectively. Consequently, the teeth L22 and R22 of the link gears 7 and 8 are inserted into the grooves L1B and R1B of the front arms 5 and 6, respectively, and the tooth L22 is fitted into the groove L1B between the teeth L11 and L12 and the tooth R22 is fitted into the groove R1B between the teeth R11 and R12.

Further, in response to the pivotal motion of the front arm 6, the detection lever 64 inputs the switch (not shown) for disk insertion detection to cause the control unit 31 to drive the motor 344.

When the motor 344 is driven to rotate the second roller 56, the second disk D2 is further carried in the direction of the arrow mark A1 and the front arms 5 and 6 are further pivoted in the directions of the arrow marks B11 and B21 as seen in FIG. 13, respectively. Upon such pivotal motion, the end faces of the teeth L13 and R13 of the front arms 5 and 6 on the leading side in the directions of the arrow marks B11 and B21 and the end faces of the teeth L23 and R23 of the link gears 7 and 8 on the leading side in the directions of the arrow marks C12 and C22 are brought into contact with each other.

Then, when the center of the second disk D2 is positioned on a straight line interconnecting the centers of the second rollers 56 and 63, the front arms 5 and 6 indicate a maximum pivotal angle during transportation of the second disk D2. In this state, the teeth L24 and R24 of the link gears 7 and 8 are not inserted in the grooves L1D and R1D of the front arms 5 and 6.

After the second disk D2 is carried in to a position at which the hole C2 thereof corresponds to the turntable 3211 in this manner, the front arms 5 and 6 are locked by the grooves 34311 of the slide cam 3431 in a state wherein the end edge of the second disk D2 and the second rollers 56 and 63 are spaced away from each other.

The carrying in process of the second disk D2 is completed therewith.

[Carrying-in of the Second Disk D2 Inserted to Rather Near to an End Portion of the Opening 30]

Figure 14:
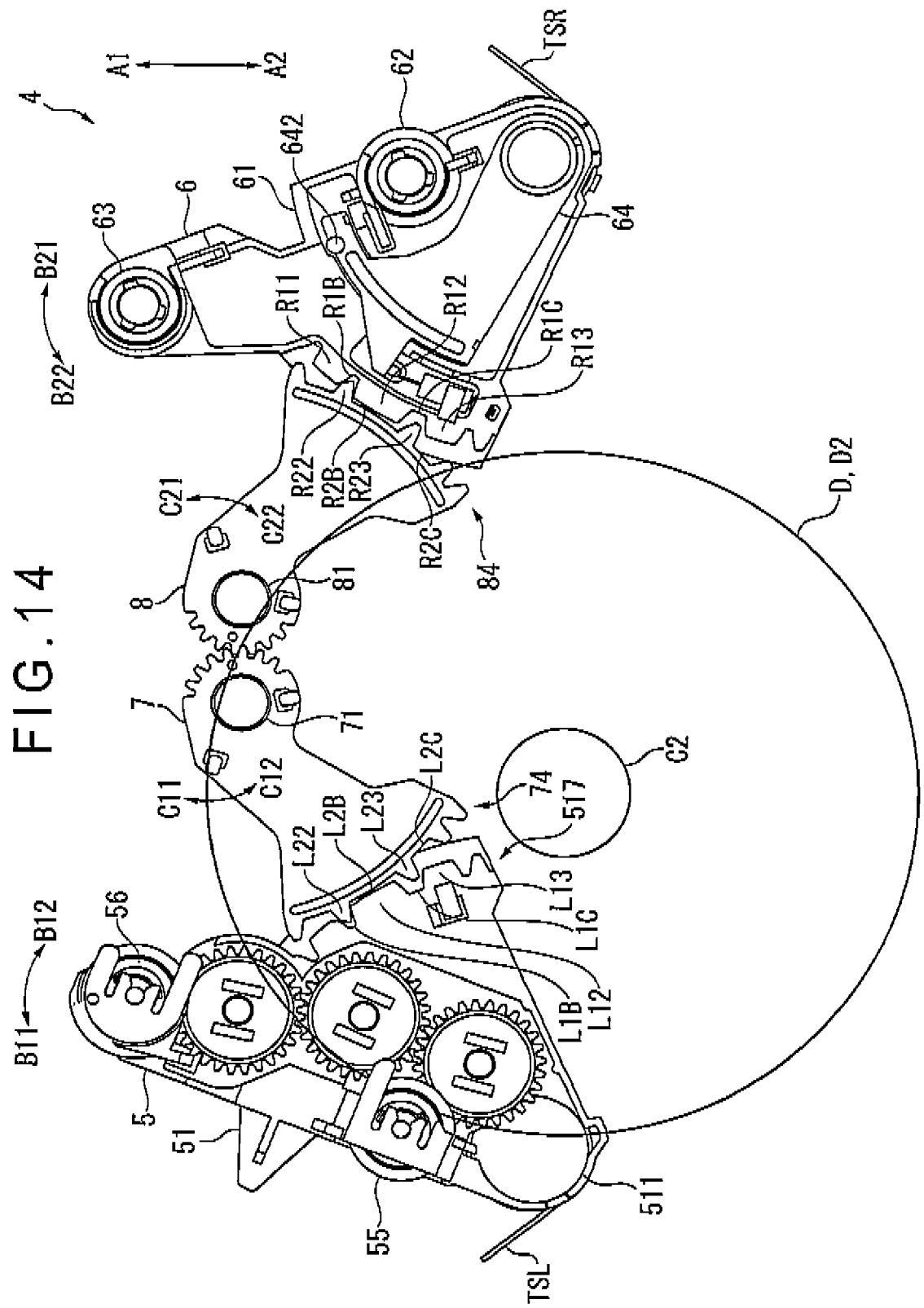
Figure 15:
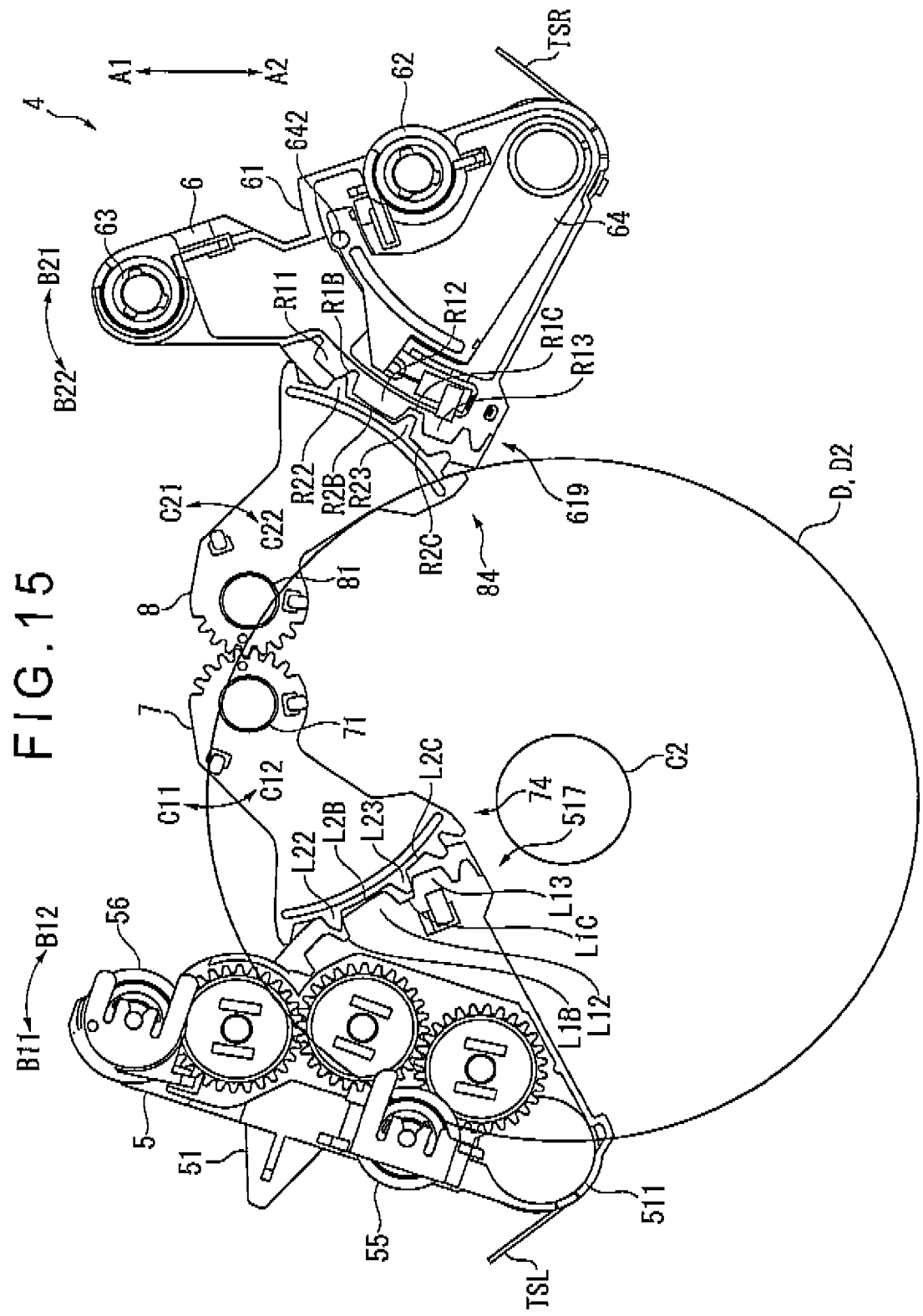
Figure 16:
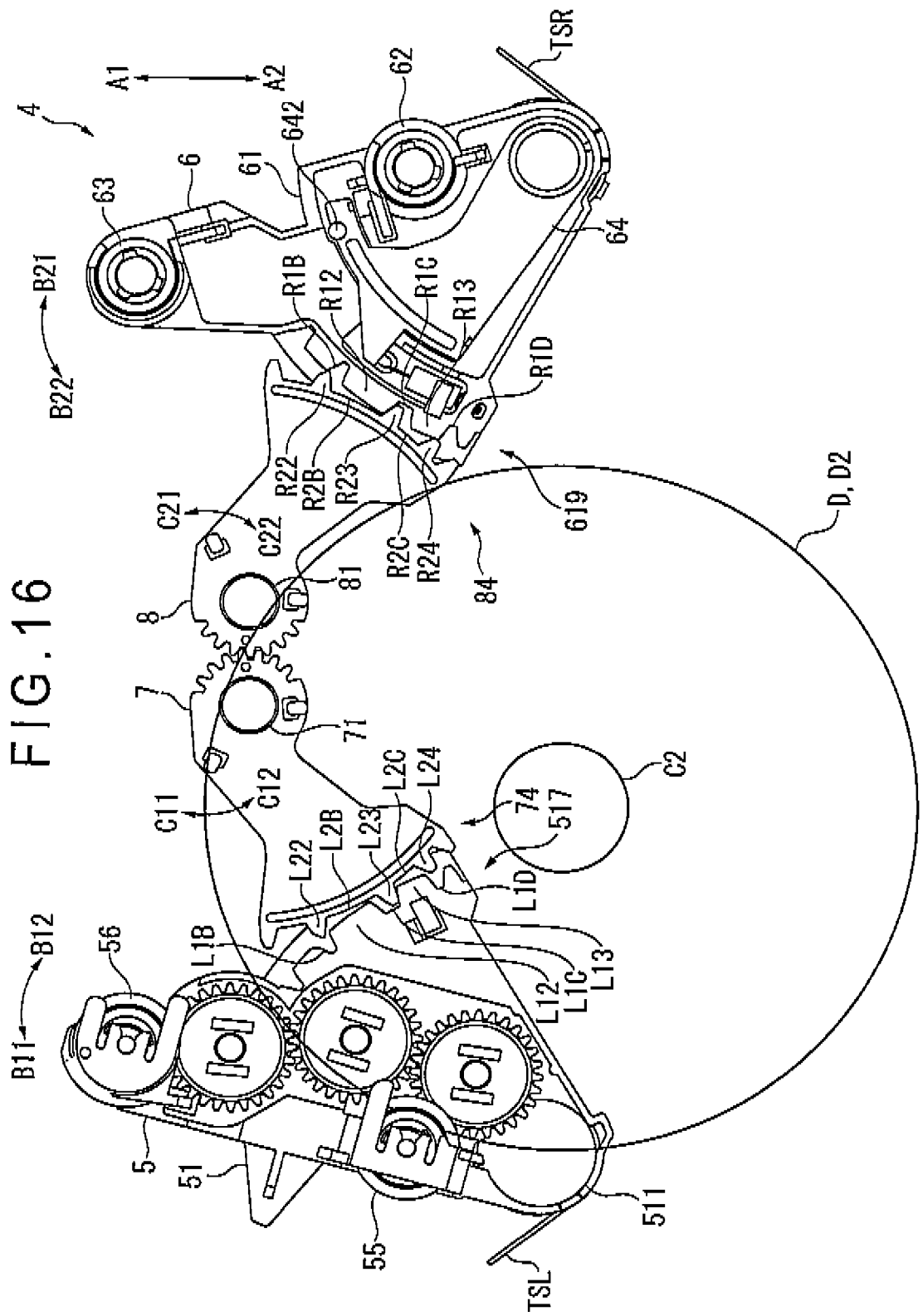

FIGS. 14 to 16 illustrate a carrying-in process of the second disk D2 inserted to a left side portion of the opening 30 by the transport unit 4.

In the following, carrying-in operation of the transport unit 4 when the second disk D2 is inserted to a left side portion of the opening 30 is described.

If the second disk D2 is inserted to a left side portion of the opening 30 when the front arms 5 and 6 are in the non-pivoted state, then an end edge of the second disk D2 is brought into contact with and gripped by the first roller 55 of the front arm 5 disposed rather near to the left side end of the opening 30.

If, in this state, the second disk D2 is further pushed into the apparatus body 3, then the front arm 5 is pivoted in the direction of the arrow mark 211 by the pushing force. By the pivotal motion, the tooth L11 of the front arm 5 pushes up the tooth L21 of the link gear 7 to rotate the link gear 7 in the direction of the arrow mark C11 until the tooth L22 of the link gear 7 is inserted into the groove L1B of the front arm 5.

The rotation of the link gear 7 is transmitted to the link gear 8 through the meshing portions 73 and 83 to rotate the link gear 8 in the direction of the arrow mark C21. Consequently, the tooth R21 of the link gear 8 pushes up the end face of the groove R1A on the leading side in the direction of the arrow mark B21 to pivot the front arm 6 in the direction of the arrow mark B21 until the tooth R22 of the link gear 8 is inserted into the groove R1B of the front arm 6.

When the detection lever 64 inputs the switch on the control board 345 in response to the pivotal motion of the front arm 6, the motor 344 is driven by the control unit 31 to rotate the first roller 55. The front arm 5 is further pivoted in the direction of the arrow mark B11 by the rotation of the first roller 55 and further movement of the second disk D2 in the direction of the arrow mark A1.

Thereupon, the end face of the tooth L12 of the front arm 5 on the leading side in the direction of the arrow mark B11 pushes up the end face of the tooth L22 of the link gear 7 on the leading side in the direction of the arrow mark C12 to rotate the link gear 7 in the direction of the arrow mark C11. In response to the rotation of the link gear 7, the link gear 8 is rotated in the direction of the arrow mark C21, whereupon the end face of the tooth R22 of the link gear 8 on the leading side in the direction of the arrow mark C21 pushes up the end face of the tooth R11 of the front arm 6 on the leading side in the direction of the arrow mark B22 to pivot the front arm 6 in the direction of the arrow mark B21.

If the front arm 5 is further pivoted from the state illustrated in FIG. 14, then the end face of the tooth L23 of the link gear 7 on the leading side in the direction of the arrow mark C12 is brought into contact with the end face of the tooth L13 of the front arm 5 on the leading side in the direction of the arrow mark B11 as seen in FIG. 15.

Thereupon, the tooth R23 of the link gear 8 is accommodated into the groove R1C of the front arm 6 which has the groove width T1C equal to twice the tooth width T23 of the tooth R23. Here, since the front arm 6 is not under the pushing force by the second disk D2, the front arm 6 is acted upon by force to return in the direction of the arrow mark B22 from the biasing force of the torsion spring TSR. Consequently, some displacement appears between the amounts of pivotal motion of the left and right front arms 5 and 6. In particular, the amount of pivotal motion, that is, the angle of pivotal motion, of the front arm 6 is smaller than that of the front arm 5 which is pushed by the second disk D2.

Therefore, the tooth R22 is placed into a state wherein it contacts with the tooth R11 but is spaced away from the tooth R12, that is, from the end face of the groove R1B on the leading side in the direction of the arrow mark B22. Further, the tooth R23 of the link gear 8 is inserted to a position in the groove R1C of the front arm 6 displaced a little in the direction of the arrow mark B21 and the end face of the front cover 23 on the leading side in the direction of the arrow mark C21 is brought into contact with the end face of the tooth R12 on the leading side in the direction of the arrow mark B22, that is, with the end face of the groove R1C on the leading side in the direction of the arrow mark B21.

If the second disk D2 is pushed in from the state illustrated in FIG. 15 and the front arm 5 is further pivoted, then the tooth L13 of the front arm 5 pushes up the tooth L23 of the link gear 7 to rotate the link gear 7 in the direction of the arrow mark C11 as seen in FIG. 16.

The rotation of the link gear 7 rotates the link gear 8 in the direction of the arrow mark C21. Here, while the link gear 8 is further rotated and the front arm 6 is further pivoted in the state wherein the end face of the tooth R23 of the link gear 8 on the leading side in the direction of the arrow mark C21 and the end face of the groove R1C of the front arm 6 on the leading side in the direction of the arrow mark B21 contact with each other, the groove width T1C of the groove R1C is substantially equal to twice the tooth width T23 of the tooth R23 and the groove width T2C of the groove R2C of the link gear 8 and the tooth width T13 of the tooth R13 of the front arm 6 substantially coincide with each other.

Therefore, the tooth R24 of the link gear 8 which is positioned on the leading side of the tooth R23 in the direction of the arrow mark C22 is not inserted into the groove R1D positioned on the leading side of the groove R1C of the front arm 6 in the direction of the arrow mark B22 but is brought into contact with the end of the tooth R13. Accordingly, the tooth R24 is not fitted into the groove R1D, and rotation of the link gear 8 and pivotal motion of the front arm 6 in the directions of the arrow marks C21 and B21 are blocked, and consequently, pivotal motion of the front arm 5 and rotation of the link gear 7 in the directions of the arrow marks B11 and C11 are blocked. In this state, the dimension of the distance between the second rollers 56 and 63 of the front arms 5 and 6 is set smaller than the diametrical dimension of the second disk D2.

When pivotal motion of the front arm 6 in the direction of the arrow mark B21 is blocked, the tooth L23 of the link gear 7 is positioned on a straight line interconnecting the axis of pivotal motion of the front arm 5, that is, the center of the opening 511, and the axis of rotation of the link gear 7, that is, the center of the opening 71. This is intended to make it easier to adjust the contacting state of the end face of the tooth L13 of the front arm 5 and the tooth L23 of the link gear 7 and to allow, when the second disk D2 contacts only with the front arm 5, the tooth R24 of the link gear 8 to contact with certainty with the end of the tooth R13 of the front arm 6 to block pivotal motion of the front arms 5 and 6 in the directions of the arrow marks B11 and B21 with certainty.

In the state wherein pivotal motion of the front arms 5 and 6 is blocked to block expansion in a transverse direction in this manner, the second disk D2 is moved in the direction of the arrow mark A1 by the pushing-in force by the user and the rotational force of the first roller 55 until an end edge of the second disk D2 is gripped by the second roller 56 of the front arm 5. When the second disk D2 is centered at a position displaced to the center between the front arms 5 and 6, it is gripped also by the second roller 63 of the front arm 6 whose pivotal motion is block while it is positioned in a spaced relationship by a distance smaller than the diameter of the second disk D2. Thereupon, the front arm 5 is pivoted a little in the direction of the arrow mark B12 at a point of time at which the pushing-in force of the second disk D2 by the user becomes lower than the biasing force of the torsion spring TSL.

In response to the pivotal motion of the front arm 5 and the rotation of the link gear 7, the link gear 8 is rotated and the front arm 6 is pivoted in the directions of the arrow marks C22 and B22, respectively, whereupon the tooth R24 of the link gear 8 and the tooth R13 of the front arm 6 are spaced away from each other thereby to cancel the blocking against pivotal motion of the front arms 5 and 6.

In this manner, the second disk D2 gripped by the second rollers 56 and 63 of the front arms 5 and 6 is carried in the direction of the arrow mark A1 until it reaches a position at which the hole C2 thereof corresponds to the turntable 3211 similarly to the second disk D2 when it is inserted to a middle position of the opening 30.

By the operation described above, also when the second disk D2 is inserted to a position rather near to the left side end of the opening 30, it is centered and inserted into the apparatus body 3.

It is to be noted that, when the second disk D2 is inserted to a right side position of the opening 30, that is, to a position on the side on which the front arm 6 is disposed, the tooth L24 of the link gear 7 is brought into contact with the end of the tooth L13 of the front arm 5 on the opposite side to the front arm 6 conversely to that in the case described hereinabove. Consequently, pivotal motion of the front arm 5 in the direction of the arrow mark B11, and hence pivotal motion of the front arm 6 in the direction of the arrow mark B21, is blocked.

Then, while the second disk D2 is centered such that it is gripped by the second rollers 56 and 63 of the front arms 5 and 6, the front arms 5 and 6 are temporarily pivoted in the directions of the arrow marks B12 and B22, respectively, to cancel the contact between the tooth L13 and the tooth L24. Consequently, pivotal motion of the front arms 5 and 6 in the directions of the arrow marks B11 and B21 is permitted, and the second disk D2 is inserted to a position corresponding to the turntable 3211.

On the other hand, when the second disk D2 is to be carried out to the outside of the opening 30, that is, to be transported in the direction of the arrow mark A2, the transport unit 4 operate reversely. In this instance, the teeth L11 and R11 of the front arms 5 and 6 and the teeth L22 and R22 of the link gears 7 and 8 are brought into meshing engagement with each other smoothly through engagement of the teeth L11 and R11 formed on the teeth L11 and R11 and the cutaway portions L221 and R221 formed on the teeth L22 and R22 similarly as in the case wherein the first disk D1 is carried out as described above. It is to be noted that, upon carrying out of the second disk D2, it is gripped by the second rollers 56 and 63, and rotation of the second roller 56 stops in a state wherein part of the second disk D2 is exposed to the opening 30.

With the disk apparatus 1 of the present embodiment described above, the following effects can be achieved.

If the disk D contacts with and is gripped by the first rollers 55 and 62 of the front arms 5 and 6, then the front arms 5 and 6 are pivoted in the directions of the arrow marks B11 and B21 against the biasing force of the torsion springs TSL and TSR and the link gears 7 and a which mesh with the front arms 5 and 6 are rotated in the directions of the arrow marks C11 and C21, respectively. If the pushing-in force of the disk D is transmitted substantially equally to the front arms 5 and 6, then meshing engagement of the left and right front arms 5 and 6 and the link gears 7 and 8 advances in synchronism against the biasing force of the torsion springs TSL and TSR. Consequently, the first disk D1 can be carried into the apparatus body 3 while being held substantially in the middle of the front arms 5 and 6 without the pivotal motion of the front arms 5 and 6 blocked.

On the other hand, if the second disk D2 of a smaller diameter than that of the first disk D1 is inserted to a position of the opening 30 rather near to one end portion and is contacted with and gripped only by the first roller of the front arm which is positioned on the one end side, then the front arm on the other side is not acted upon by the pushing-in force from the second disk D2 but is biased in a direction toward the opening 30 by the biasing force of the torsion spring. Therefore, the front arm on the other side which is not acted upon the pushing-in force from the second disk D2 contacts at an end faces of the arm side first tooth thereof on the side in the disk insertion direction with the link side first tooth of the link gear. Consequently, the end of the link side second tooth and the end of the arm side of the second tooth contact with each other to block further pivotal motion of the front arm on the other side and hence of the one front arm, that is, pivotal motion in the directions of the arrow marks B11 and B21. Then, since pivotal motion of the front arms 5 and 6 is blocked unless the second disk D2 is gripped by the second rollers 56 and 63 of the front arms 5 and 6, the second disk D2 is carried in only by the front arm on the one side, and carrying-in of the second disk D2 to an inappropriate position in the apparatus body 3 can be prevented.

Further, since the meshing portions 517 and 74 of the front arm 5 and the link gear 7 disposed leftwardly and rightwardly and the meshing portions 619 and 84 of the front arm 6 and the link gear 8 are formed symmetrical with each other, even if the second disk D2 is inserted to a position of the opening 30 rather near to the opposite end portion side, pivotal motion of the front arms 5 and 6 can be blocked as described above.

2. Second Embodiment

Now, a disk apparatus 1A according to a second embodiment of the present invention is described.

The disk apparatus 1A of the present embodiment has a configuration similar to that of the first embodiment described hereinabove. However, the disk apparatus 1A is different from the disk apparatus 1 in that, while the disk apparatus 1 is configured such that, when the second disk D2 is inserted to a position of the opening 30 rather near to the left end, the tooth R24 of the link gear 8 is brought into contact with the tooth R13 of the front arm 6 to block pivotal motion of the front arms 5 and 6 in the directions of the arrow marks B11 and B21, a groove into which the tooth R24 is to be inserted is hidden by a detection lever to block pivotal motion of the front arms.

Figure 17:
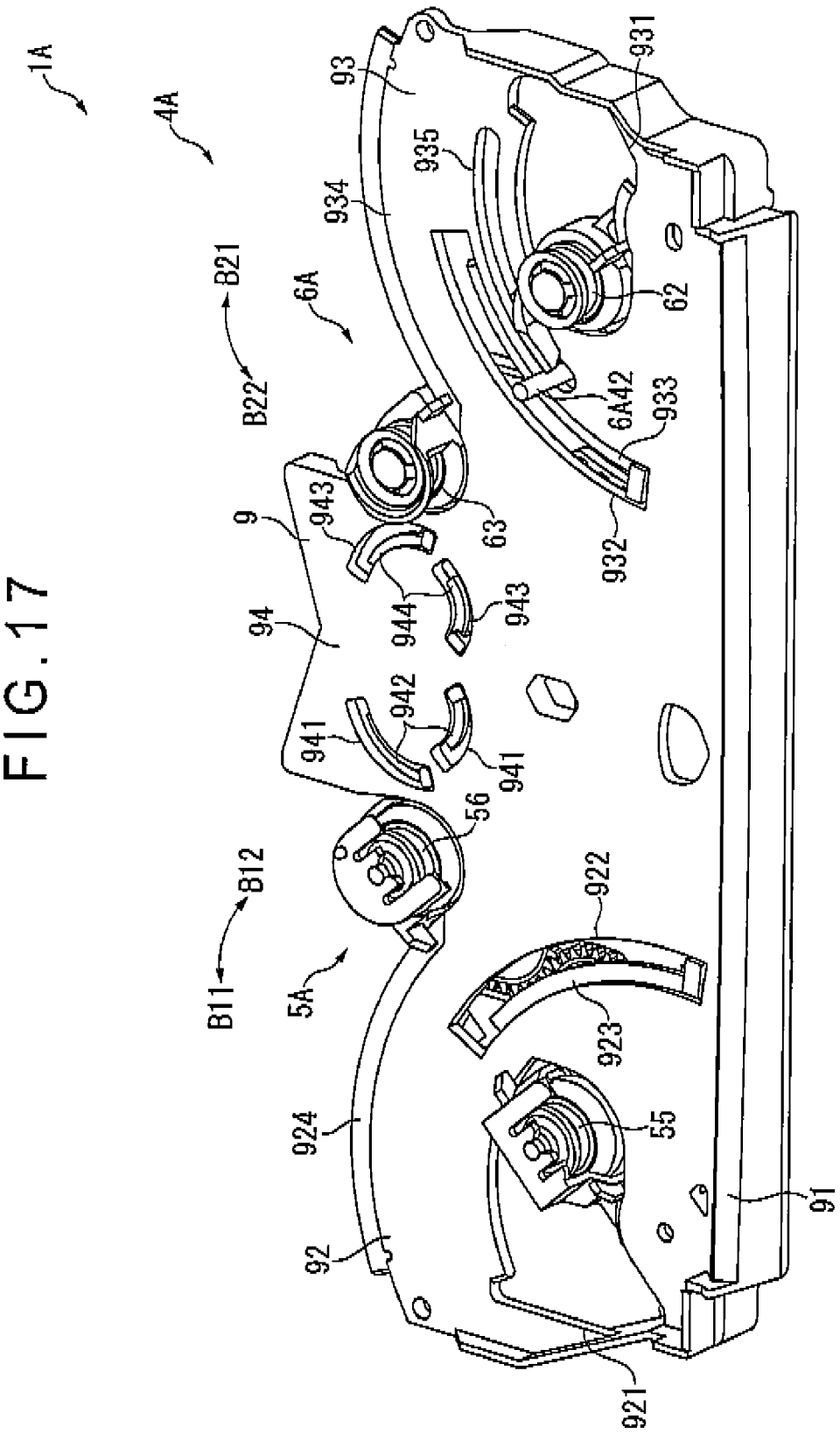
FIG. 17 is a perspective view showing a transport unit of another disk apparatus to which an embodiment of the present invention is applied.

Referring to FIG. 17, the disk apparatus 1A of the present embodiment includes an apparatus body having a configuration similar to that of the apparatus body 3 described hereinabove, and a cover member 2. The apparatus body includes a control unit 31, an optical unit 32, an upper unit 33, a lower unit 34 and a transport unit 4A.

The transport unit 4A corresponds to a disk transport apparatus and is attached to a position of the base frame 341 of the lower unit 34 substantially same as that of the transport unit 4 described hereinabove. The transport unit 4A carries a disk D inserted from the opening 30 into the apparatus body and carries out the disk D accommodated in the apparatus body to the outside of the opening 30.

[Configuration of the Transport Unit 4A]

Figure 18:
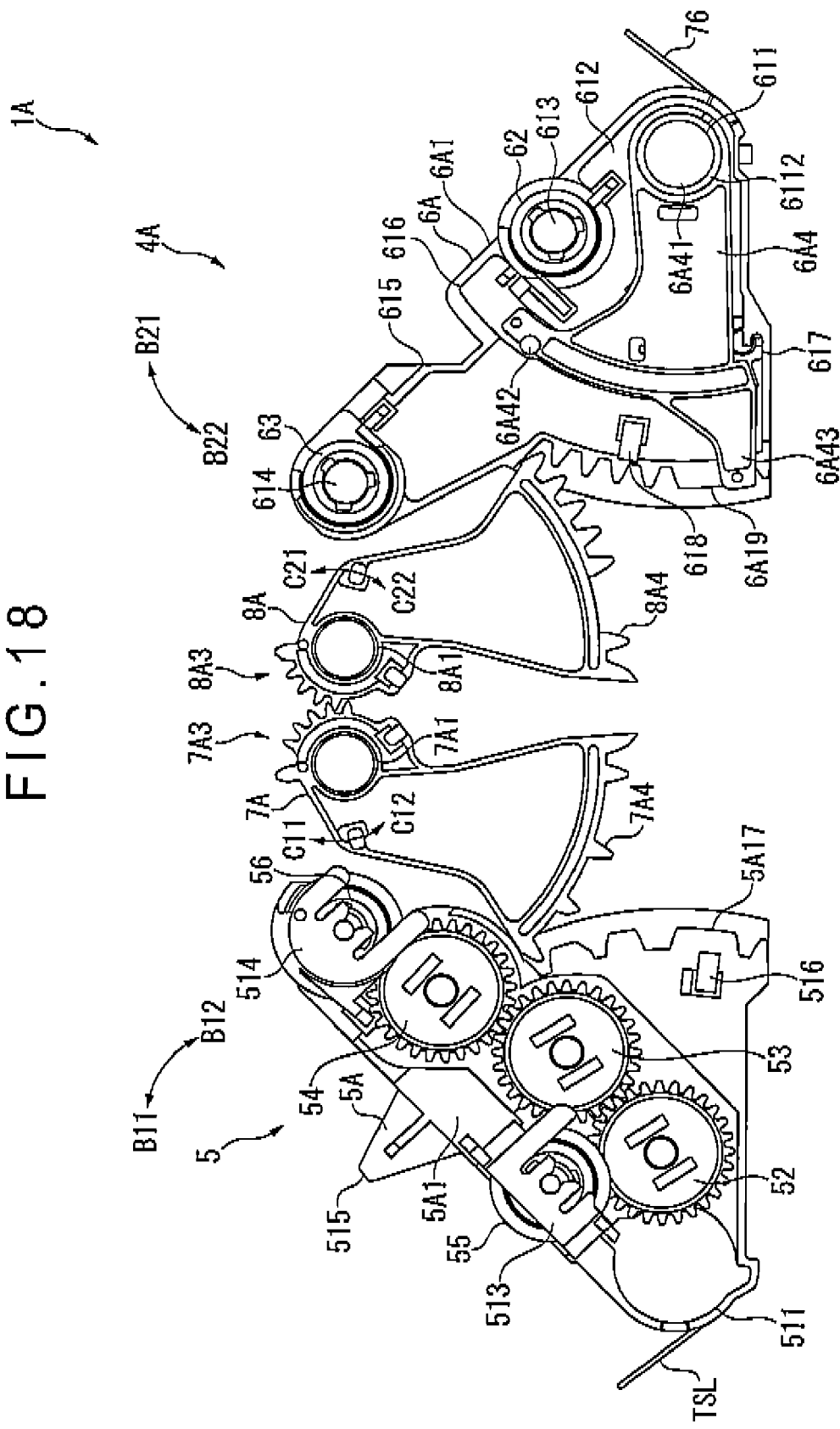
FIG. 18 is a plan view showing the transport unit of FIG. 17.

FIGS. 17 and 18 show the transport unit 4A. It is to be noted that, in FIG. 18, the bracket 9 is not shown.

Referring to FIGS. 17 and 18, such a transport unit 4A as described above corresponds to a disk transport apparatus and includes a pair of front arms 5A and 6A, and a pair of link gears 7A and 8A (refer to FIG. 18) held in meshing engagement with the front arms 5A and 6A and held in meshing engagement with each other. The transport unit 4A further includes a pair of torsion springs TSL and TSR (FIG. 18) for biasing the front arms 5A and 6A toward the opening 30, that is, in the directions of arrow marks B12 and B22, respectively, and a bracket 9.

[Configuration of the Front Arm 5A]

The front arm 5A is mounted on the arm attaching portion 92 of the bracket 9 located on left side relative to the recessed portion 91 for pivotal motion in a direction in which it is spaced away from the recessed portion 91, that is, in the direction of an arrow mark B11 which is a first direction and a second direction, and another direction in which it approaches the recessed portion 91, that is, in the direction indicated by another arrow mark B12. Such a front arm 5A as just described corresponds to the second arm when the front arm 6A functions as the first arm, but corresponds to the first arm when the front arm 6A functions as the second arm.

The front arm 5A includes an arm body 5A1, gear wheels 52 to 54, a first roller 55 and a second roller 56. The front arm 5A is formed similarly to the arm body 51 except that a meshing portion 5A17 is formed on the arm body 5A1 in place of the meshing portion 517.

Figure 19:
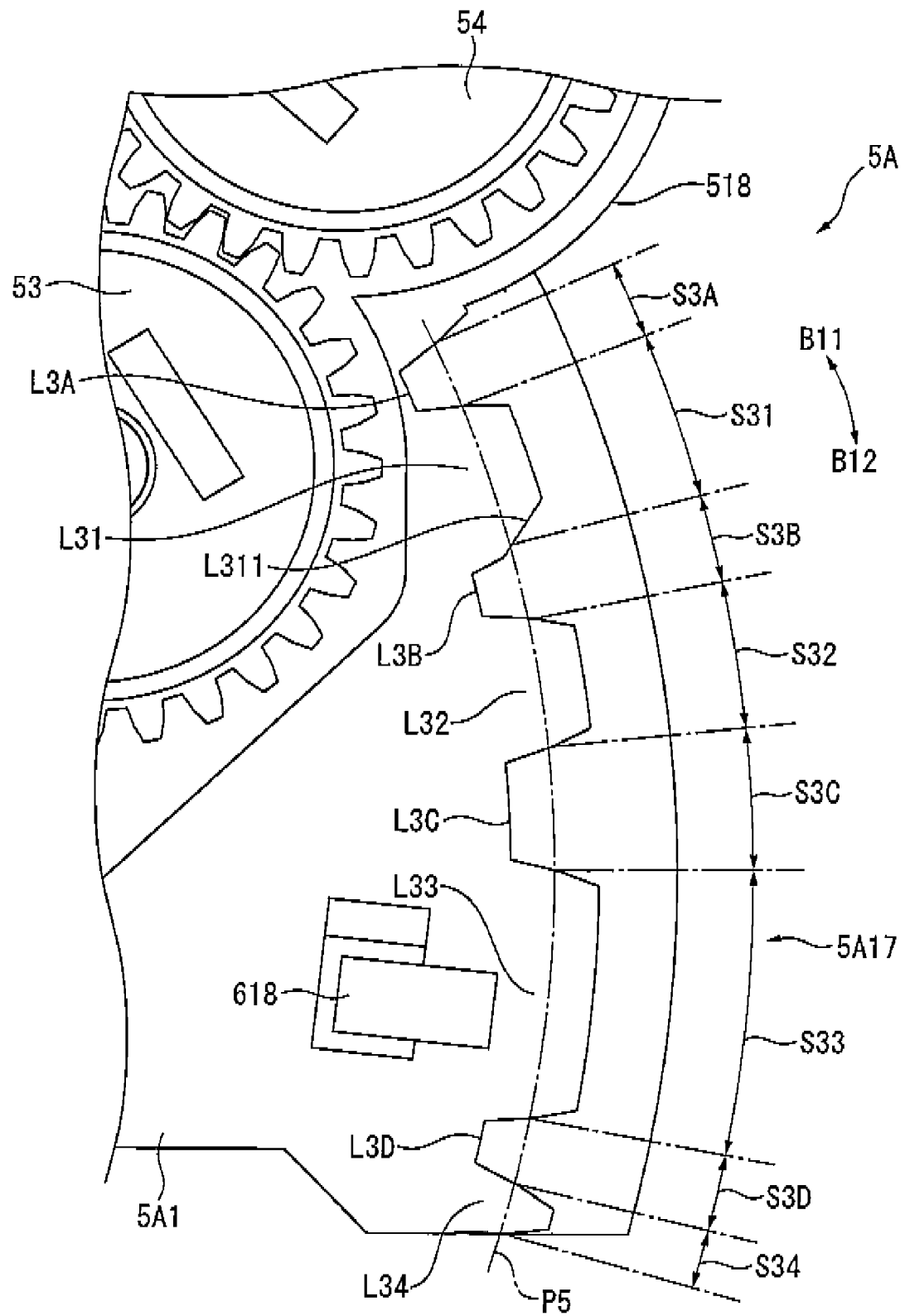
FIGS. 19 and 20 are partial enlarged views showing different ones of front arms of the transport unit of FIG. 17.

FIG. 19 shows part of the front arm 5A in an enlarged scale.

Referring to FIG. 19, a groove L3A is formed at an end portion of the meshing portion 5A17 on the leading side in the direction of the arrow mark B11 while a tooth L31 is formed on the leading side of the groove L3A in the direction of the arrow mark B12, similarly to the meshing portion 517 described hereinabove. Further, grooves L3B to L3D and teeth L32 to L34 are formed alternately on the meshing portion 5A17 in the direction of the arrow mark B12 from the tooth L31. In particular, the grooves L31 to L33 correspond to the arm side third tooth, arm side first tooth and arm side second tooth, respectively, and a moderately inclined portion L311 similar to the moderately inclined portion L111 is formed at an end portion of the tooth L31 on the leading side in the direction of the arrow mark B12.

Further, the groove widths S3A, S3B and S3D of the grooves L3A, L3B and L3D on a pitch circle P5 which is centered at the center of the opening 511 and passes middle points between the bottoms of the grooves L3A to L3D and the ends of the teeth L31 to L34 are set to an equal dimension and are substantially equal to the tooth width S41 of the tooth L41 of a link gear 7A hereinafter described. Further, the groove width S3C of the groove L3C is set to a dimension substantially equal to twice the groove widths S3A, S3B and S3D.

Meanwhile, the tooth widths S31 to S34 of the teeth L31 to L34 on the pitch circle P5 are set in response to the groove widths S4A to S4D of the grooves L4A to L4D of the link gear 7A, respectively.

[Configuration of the Front Arm 6A]

Referring back to FIG. 17, the front arm 6A is mounted for pivotal motion in a direction in which it is spaced away from the recessed portion 91, that is, in the direction indicated by the arrow mark B21 which is the first and second directions, and in another direction in which it approaches the recessed portion 91, that is, in the direction of the arrow mark B22, on the arm attaching portion 93 positioned on the right side of the recessed portion 91 of the bracket 9. Such a front arm 6A as described above corresponds to the second arm where the front arm 5A functions as the first arm, but corresponds to the first arm where the front arm 5A functions as the second arm.

The front arm 6A has a configuration similar to that of the front arm 6 as seen in FIG. 18 and includes an arm body 6A1, a first roller 62, a second roller 63 and a detection lever 6A4. The arm body 6A1 is similar to the arm body 61 except that it has a meshing portion 6A19 formed thereon in place of the meshing portion 619 and a contacting portion 6A1A is formed adjacent the meshing portion 6A19.

Figure 20:
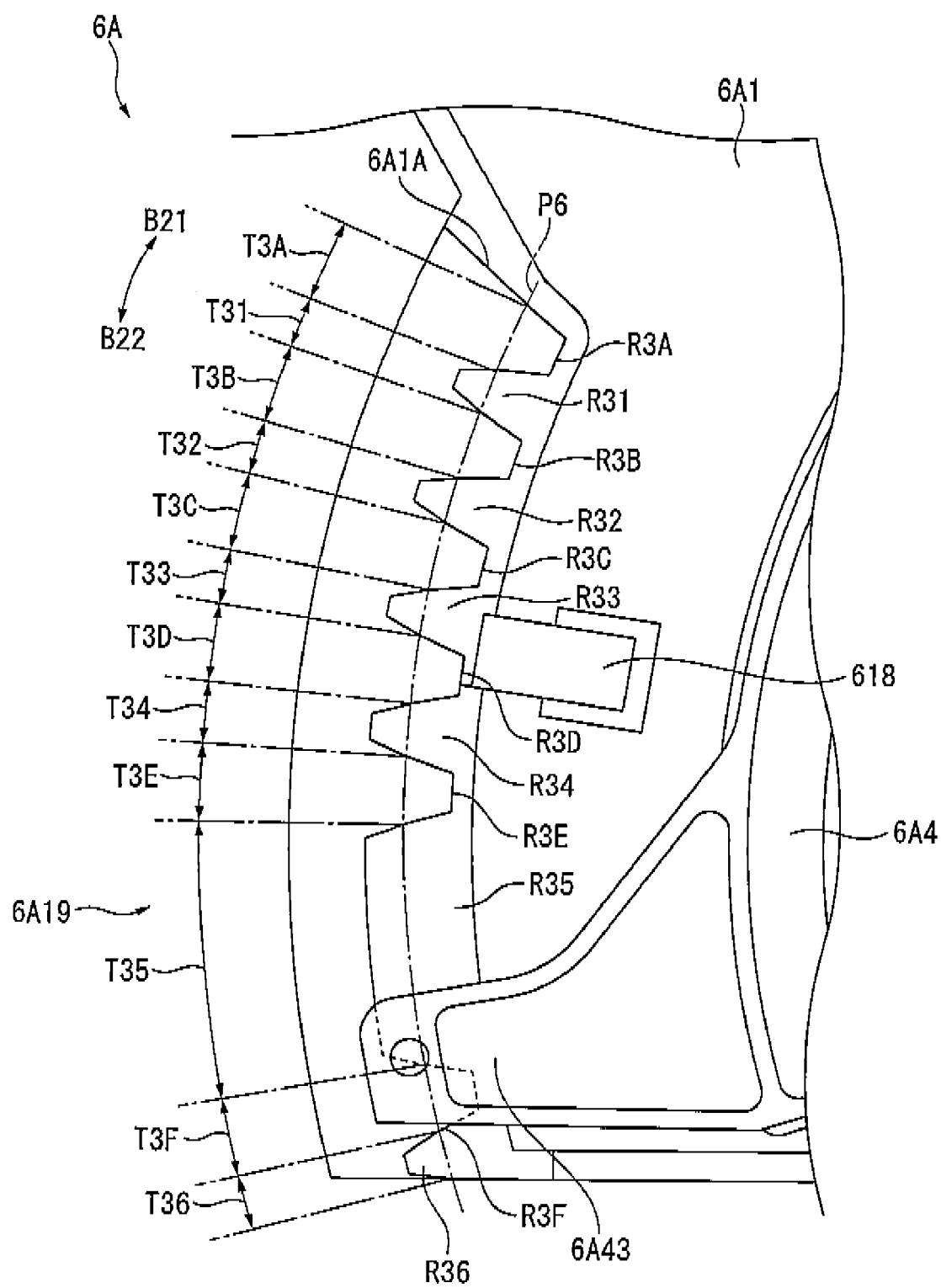

FIG. 20 shows part of the front arm 6A in an enlarged scale.

Referring to FIG. 20, the meshing portion 6A19 has a groove R3A formed at an end portion thereof on the leading side in the direction of an arrow mark B21, that is, on the side adjacent the second roller 63, and has a tooth R31 formed on the leading side of the groove R3A in the direction of an arrow mark B22. Further, grooves R3B to R3F and teeth R32 to R36 are formed alternately on the meshing portion 6A19 along the direction of the arrow mark B22 from the tooth R31.

The groove widths T3A to T3F of the grooves R3A to R3F on a pitch circle 26 which is centered at the center of the opening 611 and passes middle points between the bottoms of the grooves 23A to R3F and the ends of the teeth R31 to R36 are substantially equal to each other and coincide with the tooth widths T41 to T47 of the teeth R41 to R47 of a link gear 8A hereinafter described, respectively.

Further, the teeth T31 to T34 and T36 of the teeth R31 to R34 and R36 on the pitch circle P6 are substantially equal to the groove widths T4A to T4F of the grooves R4A to R4F of the link gear 8A. Furthermore, the tooth width T35 on the pitch circle P6 substantially coincides with the tooth width S33 of the tooth L33 and is set greater than the dimension of the detection lever 6A4 in the pivoting direction of a covering portion 6A43 of a detection lever 6A4 hereinafter described.

The contacting portion 6A1A is formed on the arm body 6A1 adjacent the leading side in the direction of the arrow mark B21 in the groove R3A of the meshing portion 6A19. A contacting portion 8A5 of the link gear 8A contacts with the contacting portion 6A1A in the non-pivoted state of the front arm 6A.

The detection lever 6A4 contacts with an end edge of the disk D inserted in the opening 30 and is pivoted in the direction of the arrow mark B21 with respect to the front arm 6A in response to pushing-in of the disk D in the direction of the arrow mark A1 to input the switch for disk insertion detection on the control board 345. An opening 6A41 of a substantially circular shape in planar view is formed in the detection lever 6A4, and an annular portion 6112 formed around the opening 611 is fitted with the detection lever 6A4 as seen in FIG. 18. The detection lever 6A4 is mounted for pivotal motion on the front arm 6A around the opening 6A41. Such a detection lever 6A4 as just described is biased in the direction of the arrow mark B22 on the front arm 6A by a tension spring not shown.

Further, a contacting pin 6A42 is formed at a position of the detection lever 6A4 substantially same as the position of the contacting pin 642 of the detection lever 64 described hereinabove such that it projects upwardly from the hole portion 935 of the bracket 9 and contacts with an end edge of the disk D. When an end edge of the disk D contacts with the contacting pin 6A42, it pivots the detection lever 6A4.

Further, a covering portion 6A43 is formed on the side of the detection lever 6A4 opposite to the contacting pin 6A42, and extends in a direction in which it is spaced away from the opening 6A41. When the detection lever 6A4 is in a state where it is not pivoted relative to the front arm 6A, the covering portion 6A43 thereof is disposed at a position at which it covers the groove R3F, but when the detection lever 6A4 is in a pivoted state, the covering portion 6A43 is disposed at a position at which it overlaps with the tooth R35.

[Configuration of the Link Gear 7A]

Figure 21:
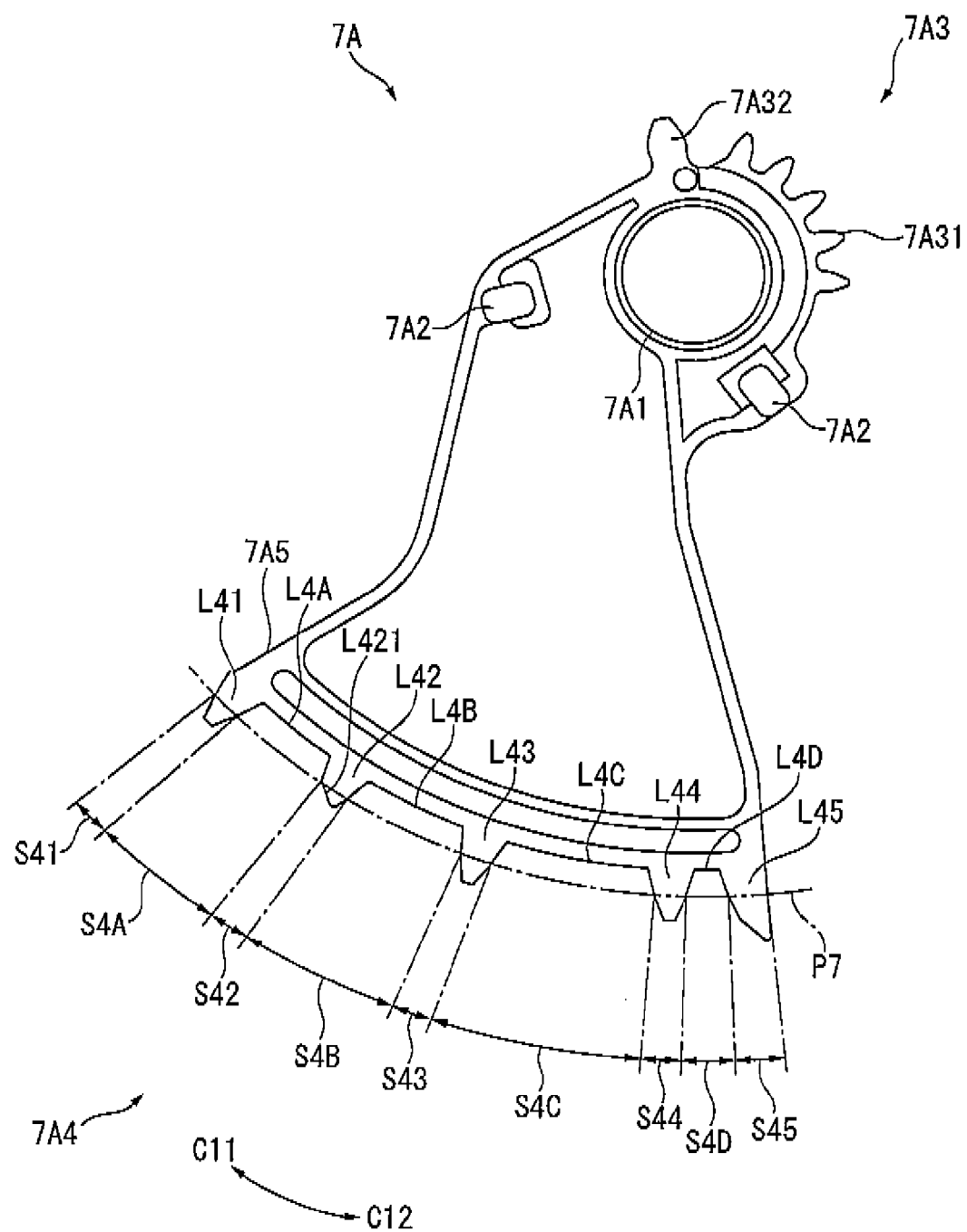
FIGS. 21 and 22 are plan views showing different ones of two link gears of the transport unit of FIG. 17.

FIG. 21 shows the link gear 7A.

Referring to FIG. 21, the link gear 7A meshes with the front arm 5A and the link gear 8A. The link gear 7A corresponds to the first link gear when the front arm 5A functions as the first arm, but corresponds to the second link gear when the front arm 5A functions as the second arm.

The link gear 7A is a member in the form of a flat plate having a configuration similar to that of the link gear 7 described hereinabove as seen in FIG. 21. The link gear 7A has an opening 7A1, hooked portions 7A2, meshing portions 7A3 and 7A4 and a contacting portion 7A5 formed at positions thereof substantially same as those of the opening 71, hooked portions 72, meshing portions 73 and 74 and contacting portion 75 of the link gear 7.

A support portion of the link attaching portion 94 is fitted in the opening 7A1, and consequently, the link gear 7A is supported for pivotal motion on the bracket 9. Meanwhile, the hooked portions 7A2 contact with the offset portion 942 of the bracket 9.

A plurality of teeth 7A31 for meshing with a plurality of teeth 8A31 formed on the meshing portion 8A3 of the link gear 8A are formed on the meshing portion 7A3, and a tooth 7A32 having a tooth width greater than the tooth width of the teeth 7A31 is formed at a position of the meshing portion 7A3 spaced from the tooth 7A31 in the direction indicated by the arrow mark C12. When the link gear 7A is pivoted in the direction of the arrow mark C11, the tooth 7A32 is brought into contact with a tooth 8A32 formed on the link gear 8A to block further pivotal motion of the link gears 7A and 8A in the directions of the arrow marks C11 and C21. In particular, the teeth 7A32 and 8A32 define a maximum amount of pivotal motion, that is, a maximum pivotal angle, of the link gears 7A and 8A, and consequently, defines a maximum amount of pivotal motion, that is, a maximum pivotal angle, of the front arms 5A and 6A.

The tooth L41 is formed at an end portion of the meshing portion 7A4 on the leading side in the direction of the arrow mark C11, and the groove L4A is formed adjacent the tooth L41 on the leading side in the direction of the arrow mark C12, similarly to the meshing portion 73 described hereinabove. Further, grooves L42 to L45 and grooves L4B to L4D are formed alternately on the meshing portion 7A4 along the direction of the arrow mark C12 from the groove L4A. In particular, the teeth L42 to L44 correspond to the link side third tooth, link side first tooth and link side second tooth, respectively. Further, the tooth L45 has a height greater than that of the other teeth L41 to L44. This is intended to block pivotal motion of the link gear 7A in the direction of the arrow mark C11 from a state wherein the tooth L34 is inserted in the groove L4D positioned on the leading side of the tooth L45 in the direction of the arrow mark C11. Further, a cutaway portion L421 similar to the cutaway portion L221 is formed on the tooth L42.

The tooth widths S41 to S45 of the teeth L41 to L45 on a pitch circle P7 which is centered at the center of the opening 7A1 and passes middle positions between the ends of the teeth L41 to L44 and the bottoms of the grooves L4A to L4D are substantially same as the groove width S3A of the groove L3A.

Meanwhile, the groove width S4A of the groove L4A on the pitch circle P7 has a dimension with which the teeth L41 and L42 can individually contact with the tooth L31. Further, the groove width S4B of the groove L4B on the pitch circle P7 is greater than the tooth width S32 of the tooth L32, and the groove widths S4C and S4D of the grooves L4C and L4D on the pitch circle P7 are set so as to substantially coincide with the tooth widths S33 and S34 of the teeth L33 and L34, respectively.

[Configuration of the Link Gear 8A]

Figure 22:
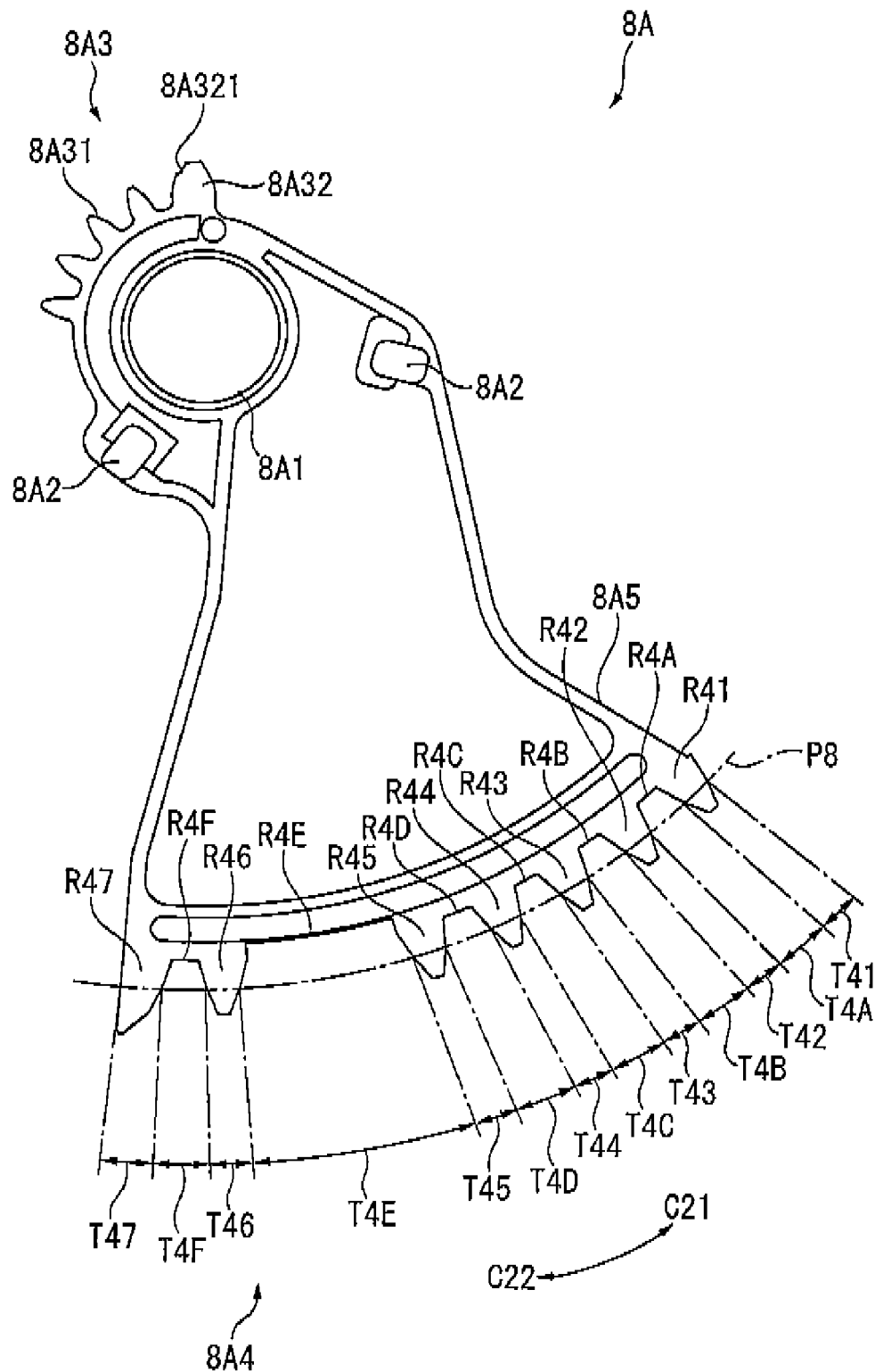

FIG. 22 shows the link gear 8A.

Referring to FIG. 22, the link gear 8A is a member in the form of a flat plate which meshes with the front arm 6A and the link gear 7A, and has a substantially mirror symmetrical structure with the link gear 7A. The link gear 8A corresponds to the first link gear where the front arm 6A functions as the first arm, but corresponds to the second link gear where the front arm 6A functions as the second arm.

The link gear 8A has an opening 8A1, a hooked portion 8A2 and meshing portions 8A3 and 8A4 formed at positions thereof same as those of the opening 81, hooked portions 82 and meshing portions 83 and 84 of the link gear 8 described hereinabove as seen in FIG. 22. The link gear 8A further has a contacting portion 8A5 formed adjacent the meshing portion 8A4.

A support portion of the link attaching portion 94 is fitted in the opening 8A1 formed on one end side of the link gear 8A so that the link gear 8A is supported for rotation on the bracket 9. Meanwhile, the hooked portions 7A2 contacts with the offset portion 942 of the bracket 9.

A plurality of teeth 8A31 for meshing with the teeth 7A31 are formed on the meshing portion 8A3 similarly to the meshing portion 7A3 described hereinabove. Further, a tooth 8A32 having a tooth width greater than that of the tooth 8A31 is formed at a position of the meshing portion 8A3 spaced from the tooth 8A31 in the direction of the arrow mark C22, that is, in the direction of the link gear 8A which rotates when the front arm 6A is pivoted and the link gear 7A is rotated in the directions of the directions B22 and C12. A cutaway portion 8A321 is formed on the tooth 8A32 on the leading side in the direction of the arrow mark C21, and the tooth 7A32 described hereinabove contacts with the cutaway portion 8A321. The amounts of rotation and pivotal motion of the link gears 7A and 8A and the front arms 5A and 6A when such a contacting state as just described is established are maximum amounts of rotation and pivotal motion, that is, maximum angles of rotation and pivotal motion. It is to be noted that the maximum mount of pivotal motion, that is, the maximum angle of pivotal motion, is set such that the distance between the second rollers 56 and 63 becomes the diametrical dimension of the first disk D1, and the maximum amount of rotation, that is, the maximum angle of rotation of the link gears 7A and 8A, is set in accordance with the maximum mount or angle of pivotal motion of the front arms 5A and 6A.

The meshing portion 8A4 is formed substantially in an arc centered at the center of the opening 8A1 on an end edge on the opposite side to the opening 8A1. A tooth R41 is formed at an end portion of the meshing portion 8A4 on the leading side in the direction of the arrow mark C21, and a groove R4A is formed adjacent the tooth R41 on the leading side in the direction of the arrow mark C22. Further, teeth R42 to R47 and grooves R4B to R4F are formed alternately on the meshing portion 8A4 along the direction of the arrow mark C22 from the groove R4A.

The tooth widths T41 to T47 of the teeth R41 to R47 on a pitch circle P8 which is centered at the center of the opening 8A1 and passes middle points between the ends of the teeth R41 to R46 and the bottoms of the grooves R4A to R4D and R4F substantially coincide with the groove width T3A described above. Further, the groove widths T4A to T4D and T4F of the grooves R4A to R4D and R4F on the pitch circle P8 substantially coincide with the tooth width T31. Further, the groove width T4E of the groove R4E substantially coincides with the tooth width T35. It is to be noted that the reason why the tooth height of the tooth R47 is greater than that of the other teeth R41 to R46 is same as that described hereinabove in connection with the tooth L45.

Further, the bottom of the groove R4E is positioned lower than the other grooves R4A to R4D and R4F. This is because, when the covering portion 6A43 of the detection lever 6A4 is disposed at a position at which it overlaps with the tooth R35, the covering portion 6A43 projects from the tooth R35.

The contacting portion 8A5 is formed at an end edge of such a meshing portion 8A4 as described above on the leading side in the direction of the arrow mark C21. The contacting portion 8A5 contacts with the contacting portion 6A1A (FIG. 20) of the front arm 6A when the front arm 6A is in the non-pivoted state.

[Transportation of the First Disk D1 by the Transport Unit 4A]

Figure 23:
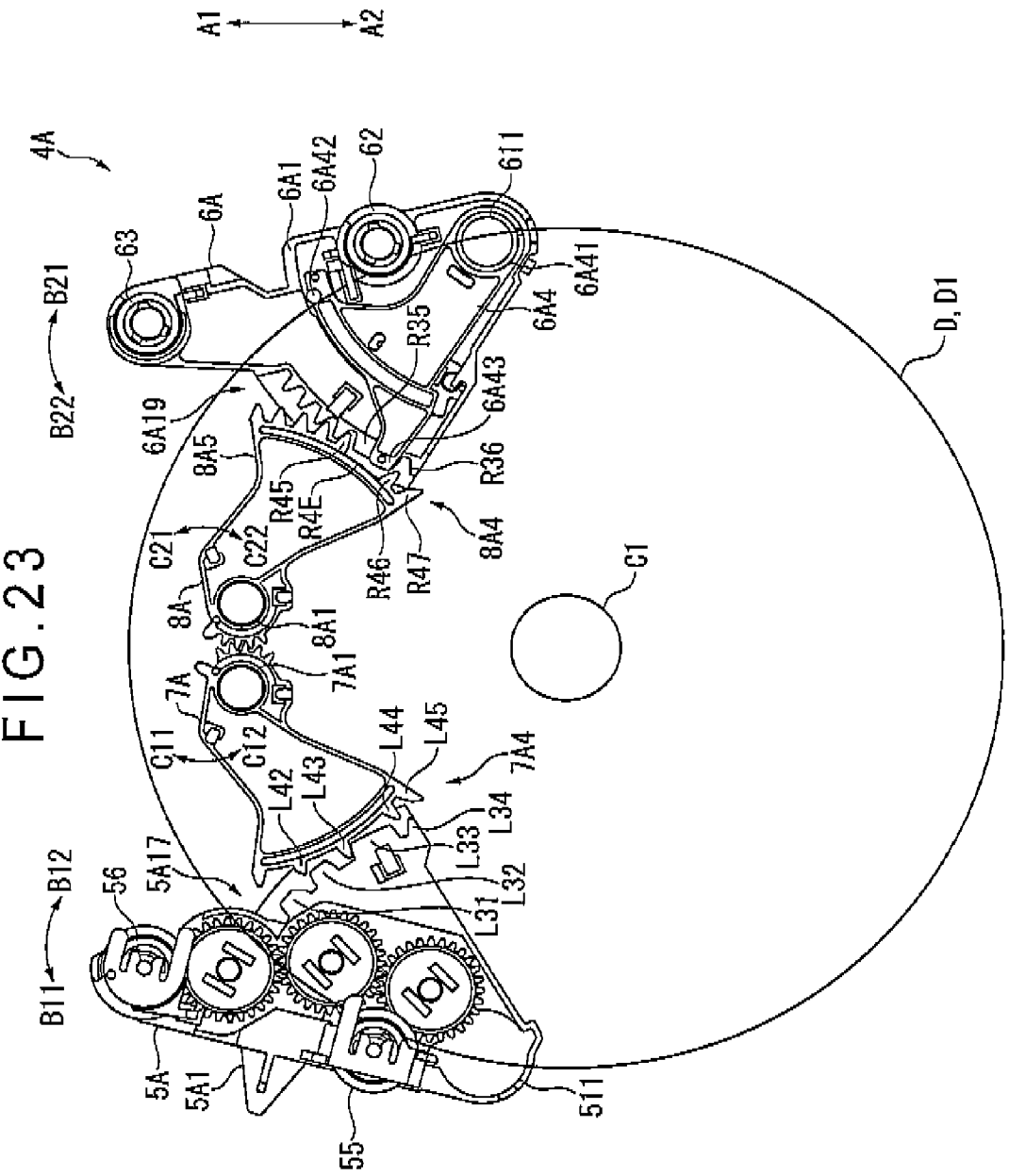
FIG. 23 is a plan view illustrating a process of transportation of a first disk by the transport unit of FIG. 17.

FIG. 23 illustrates a process of transportation of the first disk D1 by the transport unit 4A.

When the front arms 5A and 6A are in the non-pivoted state, if the first disk D1 is inserted into the opening 30, then an end edge of the first disk D1 is brought into contact with the contacting pin 6A42 of the detection lever 6A4 to pivot the front arm 6A4 in the direction of the arrow mark B21 relative to the front arm 6A. Consequently, the detection lever 6A4 inputs the switch for disk insertion detection so that the control unit 31 rotates the motor 344 and hence rotates the first roller 55 and the second roller 56. Further, by the pivotal motion of the detection lever 6A4, the covering portion 6A43 of the detection lever 6A4 is disposed at a position corresponding to the tooth R35 (FIG. 20) formed on the meshing portion 6A19 of the front arm 6A.

Thereafter, if the first disk D1 is further pushed into the apparatus body, then it is gripped by the first rollers 55 and 62 of the front arms 5A and 6A. Here, by the rotation of the first roller 55, the first disk D1 is carried toward the inside of the apparatus body, and in response to the movement of the first disk D1 in the direction of the arrow mark A1, the front arms 5A and 6A are pivoted in the directions of the arrow marks B11 and B21 as seen in FIG. 23, respectively.

More particularly, the front arm 5A is pivoted and the link gear 7A is rotated in the directions of the arrow marks B11 and C11 through contact between an end face of the grooves L31 to L33 of the front arm 5A on the leading side in the direction of the arrow mark B11 and an end face of the teeth L41 to L43 of the link gear 7A on the leading side in the direction of the arrow mark C12 similarly to the front arm 5 and the link gear 7 described hereinabove, respectively.

Meanwhile, the front arm 6A is pivoted and the link gear 8A is rotated in the directions of the arrow marks B21 and C21 through contact between an end face of the contacting portion 6A1A and the teeth R31 to R34 of the front arm 6A on the leading side in the direction of the arrow mark B22 and an end face of the grooves R41 to R45 of the link gear 8A on the leading side in the direction of the arrow mark C21 by the torsion spring TSR which exerts biasing force higher than that of the torsion spring TSL.

In this state, since the covering portion 6A43 of the detection lever 6A4 is disposed at a position corresponding to the tooth R35 of the front arm 6A as described hereinabove, the tooth R46 of the link gear 8A can be inserted into the groove R3F formed on the leading side of the tooth R35 in the direction of the arrow mark B22. Consequently, upon pivotal motion of the front arm 6A in the direction of the arrow mark B21 by carrying-in of the first disk D1, the end face of the tooth R46 on the leading side in the direction of the arrow mark C21 contacts with the end face of the tooth R35 on the leading side in the direction of the arrow mark B22.

On the other hand, the end face of the tooth L33 of the front arm 5A on the leading side in the direction of the arrow mark B11 and the end face of the tooth L43 of the link gear 7A on the leading side in the direction of the arrow mark C12 contact with each other. Further, the tooth width S33 of the tooth L33 and the distance between the teeth L43 and L44, that is, the groove width S4C, substantially coincide with each other. Therefore, the groove L44 of the link gear 7A is inserted into the groove L3D of the front arm 5A, and the end face of the tooth L34 on the leading side in the direction of the arrow mark B11 is contacted with the end face of the groove L44 on the leading side in the direction of the arrow mark C12.

Thereafter, the first disk D1 is passed from the first rollers 55 and 62 to the second rollers 56 and 63, and when the front arm 5A is further pivoted in the direction of the arrow mark B11, the end face of the tooth L45 of the link gear 7A on the leading side in the direction of the arrow mark C11 is contacted with the end face of the tooth L34 on the leading side in the direction of the arrow mark B12. Therefore, further pivotal motion of the front arm 5A and the link gear 7A in the directions of the arrow marks B11 and C11 is blocked by the tooth L45 of the front arm 5A.

Similarly, when the first disk D1 is passed to the second rollers 56 and 63 and the front arm 6A is further pivoted in the direction of the arrow mark B21, the end face of the tooth R47 of the link gear 8A on the leading side in the direction of the arrow mark C21 contacts with the end face of the tooth R36 of the front arm 6A on the leading side in the direction of the arrow mark B22. Consequently, further pivotal motion of the front arm 6A and the link gear 8A in the directions of the arrow marks B21 and C21 is blocked.

Where pivotal motion of the front arms 5A and 6A and rotation of the link gears 7A and 8A are blocked by the teeth L45 and R45 of the link gears 7A and 8A in this manner, the teeth 7A32 and 8A32 of the link gears 7A and 8A are in contact with each other and pivotal motion of the front arms 5A and 6A and rotation of the link gears 7A and 8A are blocked similarly. Accordingly, the distance between the second rollers 56 and 63 which grip the first disk D1 is prevented from increasing from the diametrical dimension of the first disk D1 with certainty.

Then, at a point of time at which the hole C1 of the first disk D1 comes to a position corresponding to the turntable 3211, the front arms 5A and 6A are locked in a state wherein the second rollers 56 and 63 are spaced from the end edge of the first disk D1, thereby ending the carrying-in of the first disk D1.

It is to be noted that carrying out of the first disk D1 to the outside of the opening 30, that is, carrying out in the direction of the arrow mark C11, is performed by operation of the transport unit 4A reverse to that upon insertion of the first disk D1.

[Transportation of the Second Disk D2 by the Transport Unit 4A]

Figure 24:
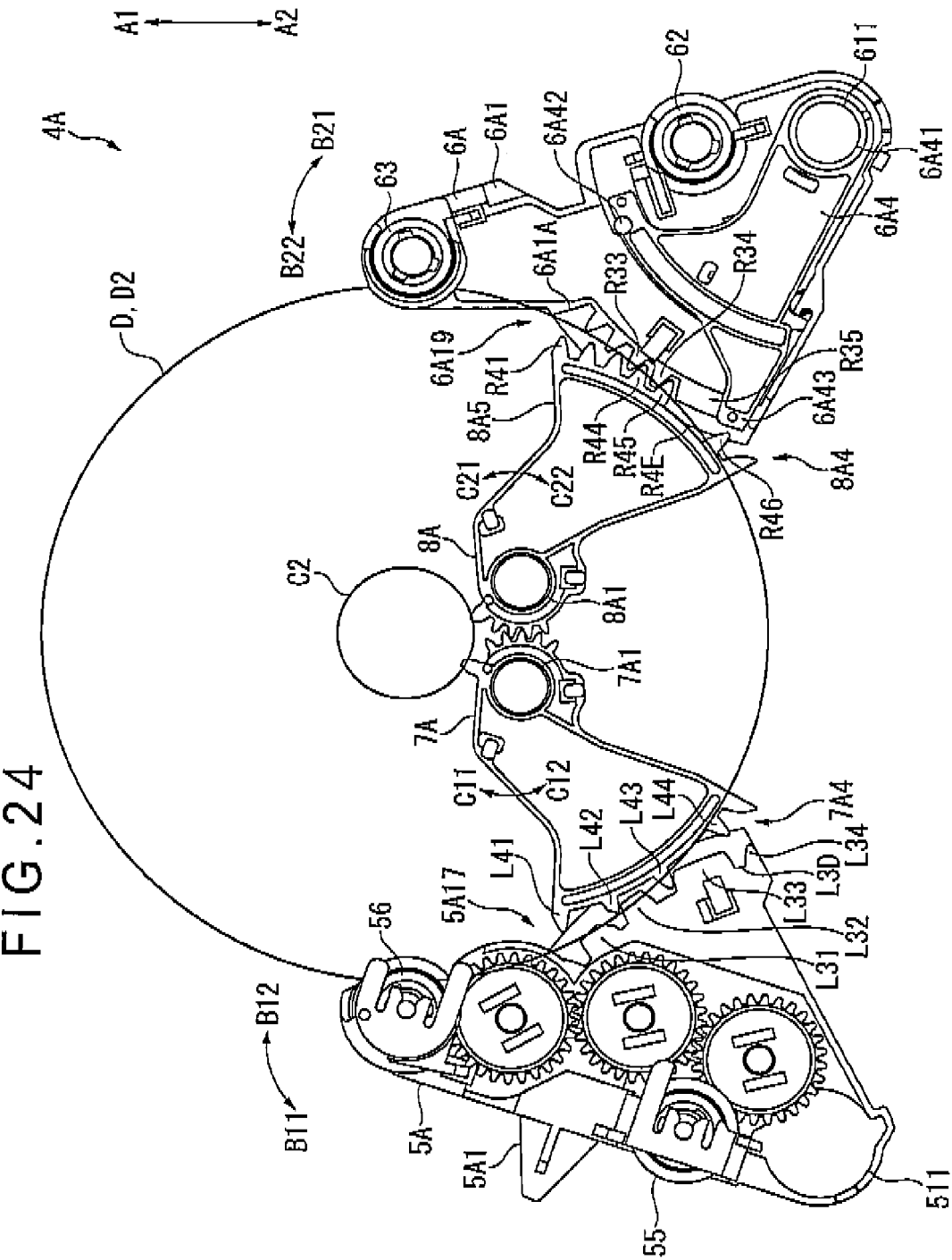
FIGS. 24 and 25 are plan views illustrating different stages of a process of transportation of a second disk by the transport unit of FIG. 17.

FIG. 24 illustrates a process of carrying in of the second disk D2 inserted to a central position of the opening 30 by the transport unit 4A.

Referring to FIG. 24, when the second disk D2 is inserted to a central position of the opening 30, an end edge of the second disk D2 is gripped by the second rollers 56 and 63 of the front arms 5A and 6A. Then, when the second disk D2 is pushed in the direction of the arrow mark A1, the front arms 5A and 6A are pivoted in the directions of the arrow marks B11 and B21 as seen from FIG. 24.

Thereupon, the grooves L31 to L33 of the front arm 5A are brought into contact with the teeth L41 to L43 of the link gear 7A, respectively, to rotate the link gear 7A in the direction of the arrow mark C11 similarly as upon carrying-in of the first disk D1 described hereinabove.

Meanwhile, the front arm 6A which is acted upon by the biasing force of the torsion spring TSR in the direction of the arrow mark B22 higher than that acting upon the front arm 5A is pivoted in the direction of the arrow mark B21 in response to rotation of the link gear 8A in the direction of the arrow mark C21 by rotation of the link gear 7A in the direction of the arrow mark C11 through contact between an end face of the contacting portion 6A1A and the teeth R31 to R34 of the front arm 6A on the leading side in the direction of the arrow mark B22 and an end face of the grooves R41 to R45 of the link gear 8A on the leading side in the direction of the arrow mark C21. By the pivotal motion of the front arm 6A, the detection lever 6A4 inputs the switch for disk insertion detection. Consequently, the first roller 55 and the second roller 56 are rotated.

Here, if the second disk D2 is inserted to a central position of the opening 30, then the end edge of the second disk D2 does not contact with the contacting pin 6A42 of the detection lever 6A4. Consequently, the detection lever 6A4 is not pivoted relative to the front arm 6A. Therefore, the groove R3F formed on the leading side of the tooth R35 in the direction of the arrow mark 222 is covered with the covering portion 6A43 of the detection lever 6A4.

However, if the second rollers 56 and 63 grip the second disk D2 and the center of the second disk D2 is positioned on a straight line interconnecting the second rollers 56 and 63, then the front arms 5A and 6A are not pivoted in the directions of the arrow marks B11 and B21 to such a degree that the teeth L44 and R46 of the link gears 7A and 8A are inserted into the grooves L3D and R3F of the front arms 5A and 6A as seen in FIG. 24. In this manner, the second disk D2 is carried in by rotation of the second rollers 56 and 63 until the hole C2 thereof comes to a position corresponding to the turntable 3211, and the front arms 5A and 6A are locked in a state wherein they are spaced away from the end edge of the second disk D2 by the slide cam 3431 described hereinabove.

The carrying in of the second disk D2 when it is inserted to a central position of the opening 30 ends therewith.

Figure 25:
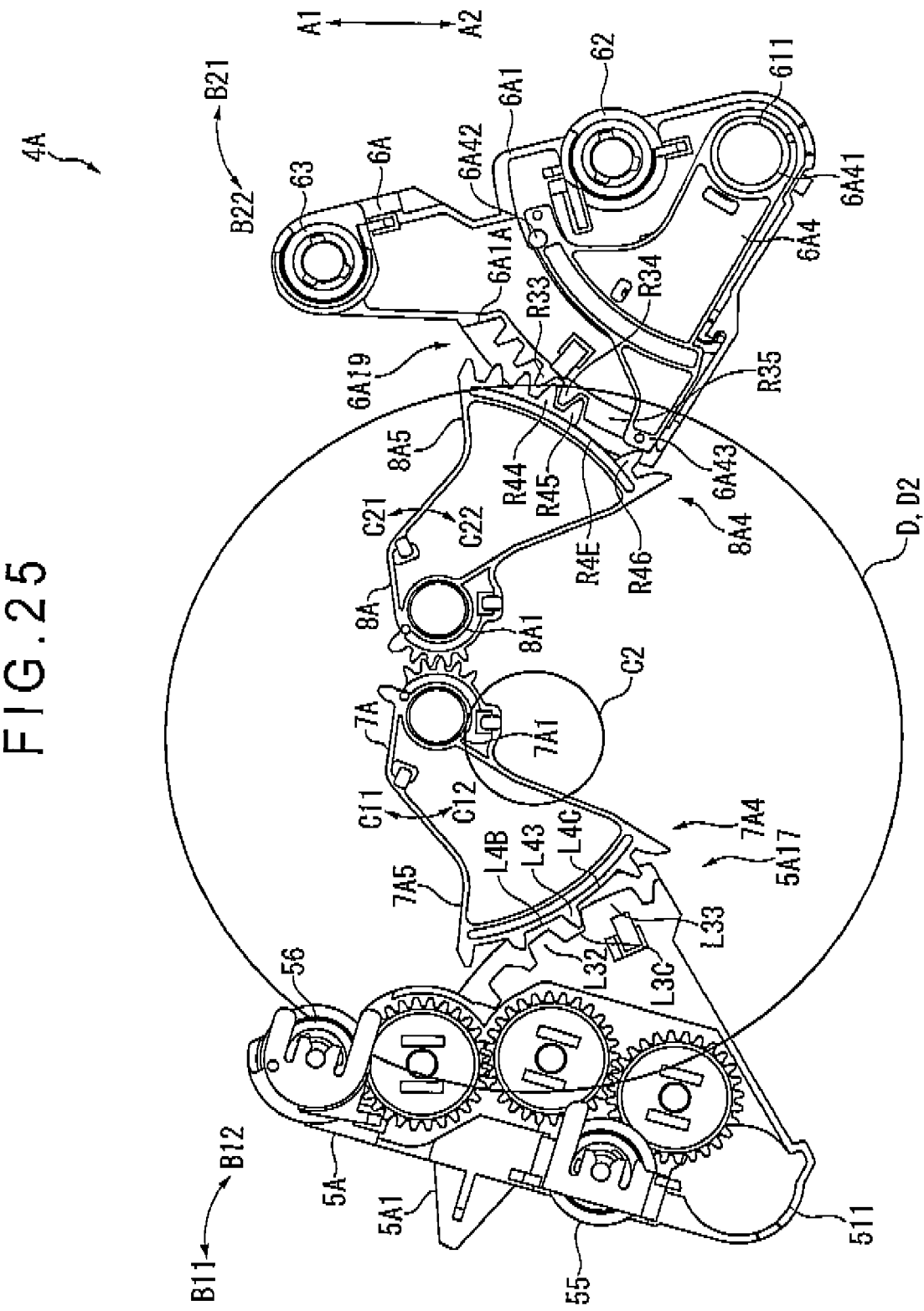

FIG. 25 illustrates a process of carrying in of the second disk D2 inserted to a left side position of the opening 30 by the transport unit 4A.

If the second disk D2 is inserted to a left side position of the opening 30, then an end edge of the second disk D2 is brought into contact with the first roller 55 of the front arm 5A disposed on the left side in the opening 30. Then, when the second disk D2 is further inserted into the apparatus body 3, the front arm 5A is pivoted in the direction of the arrow mark B11, and the link gear 7A having the teeth L41 to L43 which contact with the grooves L31 to L33 of the front arm 5A, respectively, is rotated in the direction of the arrow mark C11.

In response to the rotation of the link gear 7A, the link gear 8A is rotated in the direction of the arrow mark C21, and the grooves R41 to R45 of the link gear 8A push up the contacting portion 6A1A and the teeth R31 to R34 to pivot the front arm 6A in the direction of the arrow mark B21. By the pivotal motion of the front arm 6A, the detection lever 6A4 inputs the switch for disk insertion detection.

If the second disk D2 is further inserted and the front arm 5A is further pivoted and the link gear 7A is further rotated in the directions of the arrow marks B11 and C11, respectively, then the link gear 8A is rotated and the front arm 5A is pivoted in the directions of the arrow marks C21 and B21, respectively.

Here, since the contacting pin 6A42 of the detection lever 6A4 does not contact with the second disk D2, pivotal motion of the detection lever 6A4 relative to the front arm 6A does not occur. Therefore, since the groove R3F of the front arm 6A is covered with the covering portion 6A43 of the detection lever 6A4 as seen in FIG. 25, the tooth R46 of the link gear 8A is not inserted into the groove R3F but is brought into contact with the covering portion 6A43. Consequently, further pivotal motion of the front arm 6A and further rotation of the link gear 8A in the directions of the arrow marks B21 and C21 are blocked, and hence, also further pivotal motion of the front arm 5A and further rotation of the link gear 7A in the directions of the arrow marks B11 and C11 are blocked.

In the state wherein pivotal motion of the front arms 5A and 6A in the directions of the arrow marks B11 and B21 is blocked, since the distance between the second rollers 56 and 63 is set shorter than the diametrical dimension of the second disk D2, the second disk D2 is passed from the first roller 55 to the second roller 56 and is centered toward a middle position between the front arms 5A and 6A by rotation of the second roller 56. Thereafter, the second disk D2 is gripped also by the second roller 63 on the opposite side.

Thereupon, at a point of time at which the pushing-in force to the second disk D2 by the user becomes lower than the biasing force of the torsion springs TSL and TSR, the front arms 5A and 6A are pivoted a little in the directions of the arrow marks B12 and B22, respectively. Consequently, the covering portion 6A43 of the detection lever 6A4 and the tooth R46 of the link gear 8A are spaced away from each other to establish the state illustrated in FIG. 24.

Thereafter, the second disk D2 is carried in until the hole C2 thereof comes to a position corresponding to the turntable 3211 similarly as in the case wherein the second disk D2 is inserted to a central position of the opening 30. Then, at this point of time, the front arms 5A and 6A are locked in a state wherein they are spaced away from the second disk D2, and driving of the motor 344 is stopped.

On the other hand, if the second disk D2 is inserted to a right side position in the opening 30, then the transport unit 4A operates similarly to the transport unit 4 described hereinabove.

On the other hand, when the second disk D2 is to be carried out to the outside of the opening 30, the transport unit 4 operates reversely to that in the case wherein the second disk D2 is inserted to a central position of the opening 30. It is to be noted that, upon carrying out of the second disk D2, the second disk D2 is gripped by the second rollers 56 and 63, and driving of the motor 344 is stopped in a state wherein part of the second disk D2 is exposed to the outside of the opening 30 and rotation of the second roller 56 is stopped thereby similarly as in the case of the transport unit 4 described hereinabove.

With the disk apparatus 1A of the present embodiment described above, similar effects to those which can be achieved by the disk apparatus 1 described hereinabove can be achieved. In addition, the following effects can be achieved.

When the first disk D1 is inserted into the opening 30, since the detection lever 6A4 is pivoted by the first disk D1 to expose the groove R3F, pivotal motion of the front arms 5A and 6A when the first disk D1 is inserted can be permitted.

Further, when the second disk D2 is inserted to a substantially central position of the opening 30 and gripped by the second rollers 56 and 63 of the front arms 5A and 6A, since the second disk D2 does not contact with the detection lever 6A4, the detection lever 6A4 is not pivoted. However, even if the front arms 5A and 6A are pivoted by the greatest amount when the second disk D2 is to be transported, since the tooth R46 of the link gear 8A does not contact with the covering portion 6A43, transportation of the second disk D2 is not disturbed by the detection lever 6A4.

On the other hand, if the second disk D2 is inserted to a position of the opening 30 displaced a little toward the left end, then since the groove R3F of the front arm 6A is covered with the covering portion 6A43 of the detection lever 6A4, the tooth R46 of the link gear 8A is not fitted into the groove R3F and the meshing portion 8A4 of the link gear 8A and the meshing portion 6A19 of the front arm 6A are not brought into meshing engagement with each other. Accordingly, since further pivotal motion of the front arms 5A and 6A in the directions of the arrow marks B11 and B21 can be blocked, such a situation that the second disk D2 is gripped and carried in only by the front arm 5A to a position different from the position corresponding to the turntable 3211 can be prevented.

Since the lever member for blocking pivotal motion of the front arms 5A and 6A serves also as a lever member for inputting the corresponding switch to detect insertion of the disk D, it is possible to reduce the number of parts of the disk apparatus 1A to simplify the configuration of the disk apparatus 1A.

3. Modification to the Embodiments

The present invention is not limited to the embodiments described above but includes modifications and alterations within a range within which the object of the present invention can be achieved.

While, in the second embodiment described above, the detection lever 6A4 is provided on the front arm 6A which is positioned on the right side, the present invention is not limited to this, but the detection lever may be provided on the front arm 5A which is positioned on the left side. In particular, the detection lever may be provided on any one of the front arms or on both of the front arms only if it can block, when the second disk having a comparatively small diametrical dimension is brought into contact with one of the front arms, meshing engagement of a tooth of the other front arm and a tooth of the link gear which meshes with the front arm.

While, in the embodiments described above, the torsion springs TSL and TSR serving as biasing means for biasing the front arm 5 or 5A and the front arm 6 or 6A in the directions of the arrow marks B12 and B22 are different in biasing force, the present invention is not limited to this. In particular, the torsion springs TSL and TSR may have same biasing force. Further, although the biasing force of the torsion spring TSR is higher than that of the torsion spring TSL, conversely the biasing force of the torsion spring TSL may be higher than that of the torsion spring TSR.

Further, in the first embodiment, the front arms 5 and 6 have a plurality of teeth L11 to L14 and a plurality of teeth R11 to R14 formed thereon while the link gears 7 and 8 have a plurality of teeth L21 to L25 and a plurality of teeth R21 to R25 formed thereon, respectively, and in the second embodiment, the front arms 5A and 6A have a plurality of teeth L31 to L34 and a plurality of teeth R31 to R36 formed thereon while the link gears 7A and 8A have a plurality of teeth L41 to L44 and a plurality of teeth R41 to R47 formed thereon, respectively. However, the present invention is not limited to this. In particular, the numbers of the teeth may be set suitably based on the diametrical dimensions of the disks D to be transported, the dimensions of the front arms 5 and 6 or 5A and 6A and the link gears 7 and 8 or 7A and 8A.

Further, while, in the embodiments described above, the transport unit 4 or 4A as a disk transport apparatus, the upper unit 33 and the lower unit 34 are provided on the disk apparatus 1 or 1A, the present invention is not limited to this. In particular, the disk transport apparatus may be formed as an apparatus wherein a pair of arms carry in a disk while centering the disk between the arms.

The present invention can be utilized suitably to disk apparatus of the slot-in type.

It should be understood by those skilled in the art that various modifications, combinations, sub-combinations and alterations may occur depending on design requirements and other factors insofar as they are within the scope of the appended claims or the equivalents thereof.

The priority application Number JP2007-231667 upon which this patent application is based is hereby incorporated by reference.

What is claimed is:

1. A disk transport apparatus for transporting a disk, comprising:
    first and second arms disposed such that first end portions thereof are positioned closely to each other while second end portions thereof are spaced away from each other and mounted for pivotal motion in a first direction and a second direction in which the first and second arms are spaced away from each other around the second end portions thereof to transport the disk; and
    a link for pivoting one of the first and second arms in response to pivotal motion of another one of the first and second arms;
    the first arm and the link having a plurality of teeth and an arm side meshing portion and a link side meshing portion, respectively, which mesh with each other;
    the first arm having a pivotal motion blocking portion which blocks meshing engagement between the arm side meshing portion and the link side meshing portion to block pivotal motion of the first and second arms in the first and second directions, respectively, when the second arm is pivoted in the second direction in a state wherein the disk is in contact only with the second arm.

2. The disk transport apparatus according to claim 1, wherein the link includes:
    a first link gear having the link side meshing portion thereon for rotating in a third direction in response to the pivotal motion of the first arm in the first direction; and
    a second link gear for engaging with the second arm to rotate in a fourth direction in response to the pivotal motion of the second arm in the second direction;
    the first and second link gears having different meshing portions which mesh with each other;
    the pivotal motion blocking portion of the first arm blocking the rotation of the first link gear in the third direction thereby to block the rotation of the second link gear in the fourth direction and the pivotal motion of the second arm in the second direction.

3. The disk transport apparatus according to claim 2, wherein the pivotal motion blocking portion of the first arm causes, when the disk is brought into contact only with the second arm, an end of the teeth of the arm side meshing portion of the first arm and an end of the teeth of the link side meshing portion of the link to be contacted with each other to block the pivotal motion of the first and second arms.

4. The disk transport apparatus according to claim 3, further comprising:
    biasing means for biasing the first arm in a direction opposite to the first direction;
    the arm side meshing portion of the first arm having an arm side first tooth and an arm side second tooth formed on the leading side in a direction opposite to the first direction with respect to the arm side first tooth;
    the link side meshing portion of the link having a link side first tooth for fitting between the arm side first tooth and the arm side second tooth and a link side second tooth formed on the leading side in a direction opposite to the third direction with respect to the link side first tooth;
    the pivotal motion blocking portion of the first arm being a groove between the arm side first tooth and the arm side second tooth, the groove having a width set greater than the tooth width of the first link side first tooth but smaller than a dimension between end faces of the link side first tooth and the link side second tooth in the third direction;
    the groove between the link side first tooth and the link side second tooth having a tooth width substantially equal to the tooth width of the arm side second tooth;
    an end of the link side second tooth and an end of the arm side second tooth being contacted, when the disk is brought into contact only with the second arm, with each other to block the pivotal motion of the first and second arms in the first and second directions, respectively.

5. The disk transport apparatus according to claim 4, wherein the arm side meshing portion of the first arm has an arm side third tooth on the leading side of the arm side first tooth in the first direction while the link side meshing portion of the link has a link side third tooth on the leading side of the link side first tooth in the third direction;
    the link side third tooth being fitted between the arm side third tooth and the arm side first tooth in response to the pivotal motion of the first arm and the first link in the first and third directions, respectively;
    the arm side third tooth and the link side third tooth being spaced away from each other when the link side first tooth is brought into contact with one of the arm side first tooth and the arm side second tooth.

6. The disk transport apparatus according to claim 5, wherein the arm side first tooth of the first arm has a tooth width greater than that of the arm side second tooth.

7. The disk transport apparatus according to claim 5, wherein
    the arm side third tooth of the first arm and the link side third tooth of the link are formed in a substantially trapezoidal shape;
    the arm side third tooth having an inclined portion formed at an end portion on the leading side thereof in a direction opposite to the first direction for moderating the inclination of the end edge on the leading side in the opposite direction;
    the link side third tooth having a cutaway portion formed at an end portion on the leading side thereof in the third direction for moderating the inclination of the end edge on the leading side in the third direction.

8. The disk transport apparatus according to claim 4, wherein, when the end of the link side second tooth of the link and the end of the arm side second tooth of the first arm contact with each other, the link side first tooth is positioned on a straight line interconnecting an axis of pivotal motion of the arm and an axis of rotation of the first link gear.

9. The disk transport apparatus according to claim 1, wherein the pivotal motion blocking portion of the first arm is a lever member provided on the first arm and having an axis of pivotal motion same as the axis of pivotal motion of the first arm;

the lever member having a covering portion for covering a region between at least two ones of the plural teeth of the arm side meshing portion of the first arm;

the end of that one of the plural teeth of the link side meshing portion which is fitted into the region being brought into contact with the covering portion to block the pivotal motion of the first and second arms in the first and second directions.

10. The disk transport apparatus according to claim 9, wherein the lever member is a detection lever for being contacted and pivoted by the disk to detect the disk.

11. The disk transport apparatus according to claim 1, wherein each of the first and second arms includes a roller for contacting with the disk, and the distance between the rollers when the pivotal motion of the first and second arms in the first and second directions is blocked, respectively, is smaller than a diametrical dimension of the disk.

12. A disk apparatus, comprising;

information reading/writing means for executing at least one of reading of information recorded on a disk as a recording medium and writing of information on the disk;

a housing box accommodating the information reading/writing means therein; and a disk transport apparatus provided in the housing, the disk transport apparatus comprising:

first and second arms disposed such that first end portions thereof are positioned closely to each other while second end portions thereof are spaced away from each other and mounted for pivotal motion in a first direction and a second direction in which the first and second arms are spaced away from each other around the second end portions thereof to transport the disk; and a link for pivoting one of the first and second arms in response to pivotal motion of another one of the first and second arms;

the first arm and the link having a plurality of teeth and an arm side meshing portion and a link side meshing portion, respectively, which mesh with each other;

the first arm having a pivotal motion blocking portion which blocks meshing engagement between the arm side meshing portion and the link side meshing portion to block pivotal motion of the first and second arms in the first and second directions, respectively, when the second arm is pivoted in the second direction in a state wherein the disk is in contact only with the second arm.

13. The disk apparatus according to claim 12, wherein the housing has an opening formed therein for inserting the disk into the housing therethrough;

the opening being formed based on a diametrical dimension of a first disk as the disk whose diametrical dimension is greater than that of a second disk as the disk;

the other end portions of the first and second arms being positioned in the proximity of the opposite end portions of the opening;

the pivotal motion blocking portion of the first arm blocking the pivotal motion of the first and second arms when the second disk is brought into contact only with the second arm.

* * * * *